US011834596B2

(12) United States Patent
Nikata et al.

(10) Patent No.: US 11,834,596 B2
(45) Date of Patent: Dec. 5, 2023

(54) QUANTUM DOT AND METHOD FOR PRODUCING THE SAME

(71) Applicant: NS Materials Inc., Fukuoka (JP)

(72) Inventors: Soichiro Nikata, Fukuoka (JP); Yoko Michiwaki, Fukuoka (JP); Tomoaki Hieda, Fukuoka (JP); Yuko Ogura, Fukuoka (JP); Akio Mishima, Fukuoka (JP); Vit Kalousek, Fukuoka (JP)

(73) Assignee: NS MATERIALS INC., Fukuoka (JP)

( * ) Notice: Subject to any disclaimer, the term of this patent is extended or adjusted under 35 U.S.C. 154(b) by 89 days.

(21) Appl. No.: 17/257,074

(22) PCT Filed: Jul. 31, 2020

(86) PCT No.: PCT/JP2020/029529
§ 371 (c)(1),
(2) Date: Dec. 30, 2020

(87) PCT Pub. No.: WO2021/039290
PCT Pub. Date: Mar. 4, 2021

(65) Prior Publication Data
US 2021/0363422 A1    Nov. 25, 2021

(30) Foreign Application Priority Data

Aug. 23, 2019  (JP) ................ 2019-153204

(51) Int. Cl.
*C09K 11/88* (2006.01)
*C01G 15/00* (2006.01)
(Continued)

(52) U.S. Cl.
CPC .......... *C09K 11/883* (2013.01); *C01G 15/006* (2013.01); *B82Y 20/00* (2013.01);
(Continued)

(58) Field of Classification Search
CPC .. C01G 15/006; C09K 11/621; C09K 11/582; C09K 11/883
See application file for complete search history.

(56) References Cited

U.S. PATENT DOCUMENTS

2016/0280991 A1    9/2016  Chevallier et al.
2017/0022413 A1    1/2017  Torimoto et al.
(Continued)

FOREIGN PATENT DOCUMENTS

CN    102212363    10/2011
CN    113840895 A   12/2021
(Continued)

OTHER PUBLICATIONS

Uematsu et al., "Narrow band-edge photoluminescence from $AgInS_2$ semiconductor nanoparticles by the formation of amorphous III-VI semiconductor shells" NPG Asia Materials vol. 10, 2018, pp. 713-726 (1-14).

(Continued)

*Primary Examiner* — Matthew E. Hoban
(74) *Attorney, Agent, or Firm* — GREENBLUM & BERNSTEIN, P.L.C.

(57) ABSTRACT

To provide Cd-free chalcopyrite-based quantum dots with a narrow fluorescence FWHM and a high fluorescence quantum yield. The quantum dots of the present invention contain $AgIn_xGa_{1-x}S_ySe_{1-y}$ or $ZnAgIn_xGa_{1-x}S_ySe_{1-y}$ (where $0 \leq x < 1$ and $0 \leq y \leq 1$) and exhibit fluorescence properties including a fluorescence FWHM of less than or equal to 45 nm and a fluorescence quantum yield of greater than or equal to 35% in the green wavelength range to the red wavelength range.

17 Claims, 13 Drawing Sheets

(51) Int. Cl.
  *B82Y 20/00* (2011.01)
  *B82Y 40/00* (2011.01)

(52) U.S. Cl.
  CPC ........... *B82Y 40/00* (2013.01); *C01P 2004/64* (2013.01); *C01P 2006/60* (2013.01)

(56) References Cited

U.S. PATENT DOCUMENTS

| | | | |
|---|---|---|---|
| 2017/0267924 A1 | 9/2017 | Kuwabata et al. | |
| 2020/0006601 A1 | 1/2020 | Torimoto et al. | |
| 2020/0399535 A1 | 12/2020 | Mamuye et al. | |
| 2021/0040385 A1* | 2/2021 | Kuwabata | C09K 11/62 |
| 2021/0083146 A1 | 3/2021 | Kuwabata et al. | |

FOREIGN PATENT DOCUMENTS

| | | |
|---|---|---|
| JP | 2016-196631 A | 11/2016 |
| JP | 2017-025201 | 2/2017 |
| JP | 2018-039971 | 3/2018 |
| JP | 2018-044142 | 3/2018 |
| JP | 2018-141141 | 9/2018 |
| KR | 10-1665550 B1 | 10/2016 |
| WO | 2018/159699 | 9/2018 |
| WO | WO2019160093 * | 2/2019 |
| WO | 2019/160093 | 8/2019 |
| WO | 2019/160094 | 8/2019 |

OTHER PUBLICATIONS

Kameyama et al., "Tailored Photoluminescence Properties of Ag(In,Ga)Se$_2$ Quantum Dots for Near-Infrared In Vivo Imaging" ACS Appl. Nano Mater., 2020, 3, pp. 3275-3287.

Kameyama et al., "Wavelength-Tunable Band-Edge Photoluminescence of Nonstoichiometric Ag—In—S Nanoparticles via Ga$^{3+}$ Doping", ACS Appl. Mater. Interfaces, 2018, 10(49), pp. 42844-42855 (A-L).

Hirase et al., The Journal of Physical Chemistry Letters, "Ligand-Induced Luminescence Transformation in AgInS$_2$ Nanoparticles: From Defect Emission to Band-Edge Emission," Apr. 30, 2020, pp. 1-20.

ISR issued in WIPO Patent Application No. PCT/JP2020/029529, dated Oct. 13, 2020, English translation.

Written Opinion issued in WIPO Patent Application No. PCT/JP2020/029529, dated Oct. 13, 2020, English translation.

Office Action issued in KR Patent Application No. 10-2020-7036976, dated Sep. 22, 2023, translation.

* cited by examiner

QUANTUM DOT AND METHOD FOR PRODUCING THE SAME

TECHNICAL FIELD

The present invention relates to cadmium-free quantum dots and a method for producing the same.

BACKGROUND ART

Quantum dots are inorganic nanoparticles each containing about several thousands to several tens of thousands of atoms and having a particle size on the order of several nm to several tens of nm. A quantum dot is also referred to as a fluorescent nanoparticle as it emits fluorescence and has a nanoscale size, and is also referred to as a semiconductor nanoparticle as its composition is derived from semiconductor materials, and further is also referred to as a nanocrystal as its structure has a specific crystal structure.

A quantum dot contains positively charged metal atoms and negatively charged non-metal or semimetal atoms, and the metal atoms and the semimetal atoms are joined together by ionic bonds or covalent bonds. The ion binding properties of the atoms depend on the combination of the properties of the metal atoms and the semimetal atoms.

The light emission wavelength of a quantum dot can be controlled variously depending on its particle size and composition. Examples of the index representing the performance of a quantum dot include the fluorescence quantum yield (QY) and the fluorescence full width at half maximum (FWHM).

Examples of the performance of a quantum dot include photoluminescence. A quantum dot can emit light by absorbing light in a specific wavelength range and converting it into light in another specific wavelength range. The absorption wavelength and the light emission wavelength of the quantum dot herein can be controlled by controlling the structure, composition, and size thereof, and quantum dots can be selectively used for various applications utilizing such characteristics.

For example, when quantum dots are used for a wavelength conversion material for converting the wavelength of incident light into the visible range, the quantum dots exhibit as one of their characteristics a wide range of colors that can be represented, that is, a wide color gamut. To achieve a wide color gamut using a wavelength conversion member that includes quantum dots for converting the wavelength of incident light into the visible range, the fluorescence quantum yield and the fluorescence FWHM are the important optical properties.

High-efficiency quantum dots that have been conventionally used mainly contain cadmium (Cd). Cd-containing quantum dots are advantageous in having a high fluorescence quantum yield and a narrow fluorescence FWHM. Meanwhile, the use of Cd is restricted because of its toxicity in some countries, which has been a major obstacle to the practical use of the quantum dots.

In response, the development of Cd-free quantum dots has been frequently considered. For example, Patent Literatures cited below describe AIS-based quantum dots containing Ag, In, and S; AIGS-based quantum dots containing Ag, In, Ga, and S; AISe-based quantum dots containing Ag, In, Se; or AIGSe-based quantum dots containing Ag, In, Ga, Se.

CITATION LIST

Patent Literature

Patent Literature 1: JP 2017-025201 A
Patent Literature 2: JP 2018-039971 A
Patent Literature 3: JP 2018-044142 A
Patent Literature 4: JP 2018-141141 A
Patent Literature 5: WO 2018/159699 A

Non Patent Literature

Non Patent Literature 1: NPG Asia Materials volume 10. 2018, pp. 713-726
Non Patent Literature 2: ACS Publications 2018,10,49, 41844-41855
Non Patent Literature 3: ACS Publications Nano Mater. 2020, 3, 3275-3287
Non Patent Literature 4: The Journal of Physical Chemistry Letters; Ligand-Induced Luminescence Transformation in AgInS2 Nanoparticles: From Defect Emission to Band-Edge Emission

SUMMARY OF INVENTION

Technical Problem

Although the research and development of Cd-free chalcopyrite-based quantum dots are ongoing as described above, none of the quantum dots so far have reached the performance that can substitute for Cd-based quantum dots from the perspective of the fluorescence FWHM and the fluorescence quantum yield.

The present invention has been made in view of the foregoing, and it is an object of the present invention to provide Cd-free chalcopyrite-based quantum dots with a narrow fluorescence FWHM and a high fluorescence quantum yield.

It is another object of the present invention to provide a method for producing quantum dots that allows for synthesis of the aforementioned quantum dots in a mass-producible manner.

Solution to Problem

A quantum dot of the present invention contains $AgIn_xGa_{1-x}S_ySe_{1-y}$ or $ZnAgIn_xGa_{1-x}S_ySe_{1-y}$ (where $0 \leq x < 1$ and $0 \leq y \leq 1$) and exhibits fluorescence properties including a fluorescence FWHM of less than or equal to 45 nm and a fluorescence quantum yield of greater than or equal to 35% in the green wavelength range to the red wavelength range.

A method for producing quantum dots of the present invention includes synthesizing quantum dots, each quantum dot containing $AgIn_xGa_{1-x}S_ySe_{1-y}$ or $ZnAgIn_xGa_{1-x}S_ySe_{1-y}$ (where $0 \leq x < 1$ and $0 \leq y \leq 1$) and exhibiting fluorescence properties including a fluorescence FWHM of less than or equal to 45 nm and a fluorescence quantum yield of greater than or equal to 35% in the green wavelength range to the red wavelength range.

Advantageous Effects of Invention

According to the quantum dots of the present invention, quantum dots that are uniform in composition, particle shape, and size can be synthesized. Therefore, a narrow fluorescence FWHM and a high fluorescence quantum yield can be achieved.

In addition, according to the quantum dots of the present invention, quantum dots with a desired light emission wavelength can be synthesized according to the intended use.

Further, according to the quantum dots of the present invention, quantum dots with a narrow FWHM and also with a desired light emission wavelength can be synthesized.

Therefore, when the quantum dots are used for a wavelength conversion material, a wide color gamut can be achieved.

Furthermore, according to the method for producing the quantum dots of the present invention, Cd-free quantum dots with a narrow fluorescence FWHM can be synthesized in a mass-producible manner.

DESCRIPTION OF EMBODIMENTS

Hereinafter, an embodiment of the present invention (hereinafter abbreviated as an "embodiment") will be described in detail. It should be noted that the present invention is not limited to the following embodiment and can be implemented by being modified in various ways within the spirit and scope of the invention. It should also be noted that in this specification, the phrase " . . . to . . . " means the range of an upper limit and a lower limit, inclusive.

Figure 1A:
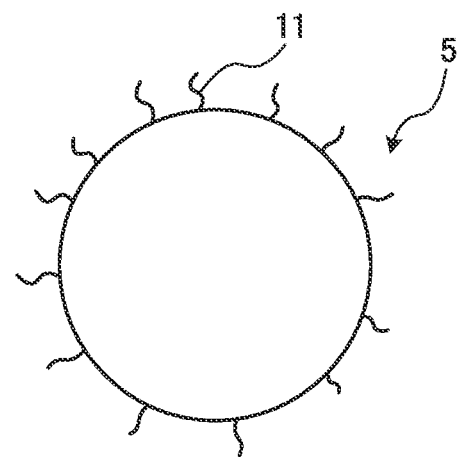
FIG. 1A and FIG. 1B are schematic views of quantum dots according to an embodiment of the present invention.

FIG. 1 are schematic views of quantum dots according to the present embodiment. A quantum dot 5 illustrated in FIG. 1A is a Cd-free nanocrystal.

In the present embodiment, the quantum dot 5 is a quantum dot containing $AgIn_xGa_{1-x}S_ySe_{1-y}$ or $ZnAgIn_xGa_{1-x}S_ySe_{1-y}$ (where $0 \leq x < 1$ and $0 \leq y \leq 1$). The quantum dot 5 according to the present embodiment is preferably a cadmium (Cd)-free nanocrystal containing at least silver (Ag), gallium (Ga), and sulfur (S), or at least silver (Ag), gallium (Ga), and selenium (Se). Alternatively, the quantum dot 5 may contain Ag, Ga, and S, or contain Ag, Ga, and Se and may further contain indium (In) or zinc (Zn).

The "nanocrystal" as referred to herein indicates a nanoparticle having a particle size on the order of several nm to several tens of nm. In the present embodiment, a large number of quantum dots 5 that are approximately uniform in particle size can be produced.

The ratio between Ag and Ga contained in the quantum dot 5 is preferably in the range of Ag/Ga=0.05 to 10. More preferably, the ratio Ag/Ga is in the range of 0.05 to 5, and further preferably, in the range of 0.1 to 3.

The ratio between Zn and Ga that can be contained in the quantum dot 5 is preferably in the range of Zn/Ga=0.1 to 10. More preferably, the ratio Zn/Ga is in the range of 0.1 to 5. Controlling the ratio can adjust the light emission wavelength.

In the present embodiment, the fluorescence wavelength can be adjusted in the green wavelength range to the red wavelength range. In particular, in the present embodiment, the fluorescence wavelength can be appropriately adjusted in the range of 400 to 700 nm. In the present embodiment, the fluorescence wavelength can also be adjusted in the range of 500 to 650 nm.

As illustrated in FIG. 1A, the quantum dot 5 preferably has a large number of organic ligands 11 coordinated to its surface. Accordingly, the aggregation of the quantum dots 5 can be suppressed and desired optical properties can be exhibited. Typical examples of the ligands that can be used for reactions include, but are not particularly limited to, the following.

(1) Primary Aliphatic Amines, Such as:

oleylamine: $C_{18}H_{35}NH_2$, stearylamine (octadecylamine): $C_{18}H_{37}NH_2$, dodecylamine (laurylamine): $C_{12}H_{25}NH_2$, decylamine: $C_{10}H_{21}NH_2$, and octylamine: $C_8H_{17}NH_2$.

(2) Fatty Acids, Such as:

oleic acid: $C_{17}H_{33}COOH$, stearic acid: $C_{17}H_{35}COOH$, palmitic acid: $C_{15}H_{31}COOH$, myristic acid: $C_{13}H_{27}COOH$, lauric acid: $C_{11}H_{23}COOH$, decanoic acid: $C_9H_{19}COOH$, and octanoic acid: $C_7H_{15}COOH$.

(3) Thiols, Such as:

octadecanethiol: $C_{18}H_{37}SH$, hexadecanethiol: $C_{16}H_{33}SH$, tetradecanethiol: $C_{14}H_{29}SH$, dodecanethiol: $C_{12}H_{25}SH$, decanethiol: $C_{10}H_{21}SH$, and octanethiol: $C_8H_{17}SH$.

(4) Phosphines, Such as:

trioctylphosphine: $(C_8H_{17})_3P$, triphenylphosphine: $(C_6H_5)_3P$, and tributylphosphine: $(C_4H_9)_3P$.

(5) Phosphine Oxides, Such as:

trioctylphosphine oxide: $(C_8H_{17})_3P=O$, triphenylphosphine oxide: $(C_6H_5)_3P=O$, and tributylphosphine oxide: $(C_4H_9)_3P=O$ The characteristic portion of the quantum dot 5 of the present embodiment will be described hereinafter. The quantum dot 5 of the present embodiment exhibits fluorescence properties including a fluorescence FWHM of less than or equal to 45 nm and a fluorescence quantum yield of greater than or equal to 35% in the green wavelength range to the red wavelength range.

Herein, the "fluorescence FWHM" means the full width at half maximum that indicates the range of the fluorescence wavelength at half the peak value of the fluorescence intensity of the fluorescence spectrum. Preferably, the fluorescence FWHM is less than or equal to 35 nm. More preferably, the fluorescence FWHM is less than or equal to 30 nm. Further preferably, the fluorescence FWHM is less than or equal to 25 nm. Since the fluorescence FWHM can be made narrow in this manner, a wide color gamut can be provided.

The fluorescence quantum yield of the quantum dot 5 of the present embodiment is preferably greater than or equal to 40%, more preferably, greater than or equal to 60%, further preferably, greater than or equal to 70%, and most preferably, greater than or equal to 80%. In this manner, the fluorescence quantum yield of the quantum dot can be increased in the present embodiment.

As described above, the quantum dot containing $AgIn_xGa_{1-x}S_ySe_{1-y}$ or $ZnAgIn_xGa_{1-x}S_ySe_{1-y}$ (where $0 \leq x < 1$ and $0 \leq y \leq 1$) of the present embodiment can have a narrow fluorescence FWHM and a high fluorescence quantum yield in the green wavelength range to the red wavelength range.

In the present embodiment, the fluorescence wavelength can be freely controlled in the range of about 400 to 700 nm. The quantum dot 5 of the present embodiment is a solid solution containing Ag, Ga, In, and Zn as the cation materials and Se and S as the anion materials. In the present embodiment, appropriately adjusting the particle size and composition of the quantum dot 5 can control the fluorescence wavelength in the range of blue-green-red colors. Therefore, the fluorescence wavelength for blue light emission is preferably in the range of 400 to 480 nm, more preferably, in the range of 410 to 470 nm, and further preferably, in the range of 420 to 460 nm. The fluorescence wavelength for green light emission is preferably in the range of 500 to 560 nm, more preferably, in the range of 510 to 550 nm, and further preferably, in the range of 520 to 540 nm. The fluorescence wavelength for red light emission is preferably in the range of 600 to 660 nm, more preferably, in the range of 610 to 650 nm, and further preferably, in the range of 620 to 640 nm.

Although the fluorescence wavelength can be controlled in the range of 400 to 700 nm in the present embodiment as described above, a wavelength conversion material for converting the wavelength of incident light into the visible range preferably provides green or red light emission.

Herein, chalcopyrite has typically been a defect-emission material with a fluorescence FWHM of 45 to 80 nm. In contrast, the quantum dot 5 of the present embodiment has a narrow fluorescence FWHM and a high fluorescence quantum yield, and can have the lifetime of fluorescence significantly shorter than that of defect emission. From such characteristics, the quantum dot 5 of the present embodiment is speculated as exhibiting band-edge emission.

In particular, according to the quantum dot 5 of the present embodiment, the quantum dot 5 that has a fluorescence FWHM of less than or equal to 30 μm, a fluorescence quantum yield of greater than or equal to 80%, and a fluorescence wavelength in the range of 510 to 650 nm can be synthesized. In this manner, properties, such as a narrow fluorescence FWHM and a high fluorescence quantum yield, can be realized not only in the green fluorescence wavelength range (around 510 to 540 nm) but also in the red fluorescence wavelength range (around 610 to 650 nm).

Figure 1B:
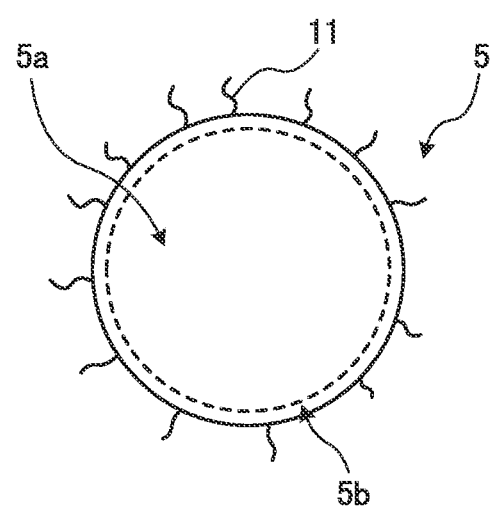

The quantum dot 5 illustrated in FIG. 1B is a core-shell structure including a core 5a and a shell 5b covering the surface of the core 5a. As illustrated in FIG. 1B, the surface of the quantum dot 5 preferably has a large number of organic ligands 11 coordinated thereto. The quantum dot 5 illustrated in FIG. 1B has a fluorescence FWHM of less than or equal to 45 nm and a fluorescence quantum yield of greater than or equal to 35%.

The core 5a of the quantum dot 5 illustrated in FIG. 1B is the nanocrystal illustrated in FIG. 1A. Therefore, the core 5a is preferably formed of a Cd-free nanocrystal containing Ag, Ga, and S or containing Ag, Ga, and Se. The shell 5b does not contain cadmium (Cd) as with the core 5a. Examples of the material of the shell 5b include, but are not particularly limited to, indium sulfide, gallium sulfide, aluminum sulfide, zinc sulfide, indium selenate, gallium selenide, aluminum selenide, and zinc selenide. For the Ga source herein, gallium chloride, gallium bromide, or gallium iodide is preferably used.

The shell 5b may be in the state of a solid solution supported on the surface of the core 5a. In FIG. 1B, the boundary between the core 5a and the shell 5b is indicated by the dotted line. This means that the boundary between the core 5a and the shell 5b may be or may not be confirmed through analysis. Regarding the quantum dot containing $ZnAgIn_xGa_{1-x}S_ySe_{1-y}$ (where $0 \leq x < 1$ and $0 \leq y \leq 1$) described above, even if a core-shell structure is not confirmed, it can be speculated that the core 5a is covered with the shell 5b because Zn is contained.

The fluorescence wavelength of the quantum dot 5 illustrated in FIG. 1B can also be freely controlled in the range of about 400 to 700 nm or in the range of about 500 to 650 nm as in FIG. 1A.

It should be noted that in the present embodiment, the quantum dot emits fluorescence even when it has only a core of AgGaS, AgGaSe, AgGaInS, or AgGaInSe. Thus, the core need not necessarily be covered with a shell. However, when a core-shell structure is provided, a further increase in the fluorescence quantum yield can be expected while the fluorescence FWHM is maintained narrow. Regarding In, fluorescence is observed regardless of whether or not In is contained. For example, a green fluorescence-emitting quantum dot can have excellent light emission properties by containing In, but even when the quantum dot does not contain In, it emits light, though there is a tendency that the fluorescence FWHM becomes large to some extent. Specifically, light emission has been confirmed with AgGaS.

In addition, using Zn typically results in defect emission due to the difference in the valence (Zn has a valence of 2, Ag has a valence of 1, and Ga or In has a valence of 3), and thus tends to result in a wide fluorescence FWHM. In contrast, in the present embodiment, even when Zn is added later, it is possible to provide a high fluorescence quantum yield while maintaining the fluorescence FWHM narrow as shown by the experiments described below. That is, using Zn can enhance the light emission properties.

Next, a method for producing the quantum dot 5 of the present embodiment will be described.

The method for producing the quantum dots of the present embodiment is characterized by synthesizing quantum dots that each contain $AgIn_xGa_{1-x}S_ySe_{1-y}$ or $ZnAgIn_xGa_{1-x}S_ySe_{1-y}$ (where $0 \leq x < 1$ and $0 \leq y \leq 1$) and exhibit fluorescence properties including a fluorescence FWHM of less than or equal to 45 nm and a fluorescence quantum yield of greater than or equal to 35% in the green wavelength range to the red wavelength range.

First, in the present embodiment, a one-pot heating synthesis is performed using an organic silver compound, an organic gallium compound, and sulfur or selenium, or using an organic silver compound, an organic indium compound, an organic gallium compound, and sulfur or selenium.

At this time, the reaction temperature is set in the range of 100 to 320° C. to synthesize AgGaS, AgGaSe, AgGaInS, or AgGaInSe. It should be noted that the reaction temperature is preferably a lower temperature, such as 280° C. or less.

In the present embodiment, an organic silver compound or an inorganic silver compound is used as the Ag material. For example, silver acetate: AgOAc or silver nitrate: $AgNO_3$ can be used, or alternatively, halides, such as chloride silver: AgCl, silver bromide: AgBr, and silver iodide: AgI, or carbamates, such as silver diethyldithiocarbamate: $Ag(SC(=S)N(C_2H_5)_2)$ and silver dimethyldithiocarbamate: $Ag(SC(=S)N(CH_3)_2)$, can be used, though the Ag material is not particularly limited thereto.

In the present embodiment, the aforementioned Ag material may be directly added to a reaction solution, but it is also possible to use an Ag material solution with a constant concentration obtained by dissolving the Ag material in an organic solvent in advance.

In the present embodiment, an organic indium compound or an inorganic indium compound is used as the In material. For example, indium acetate: $In(OAc)_3$, indium nitrate: $InNO_3$, or indium acetylacetonate: $In(acac)_3$ can be used, or alternatively, halides, such as indium chloride: $InCl_3$, silver bromide: $InBr_3$, and indium iodide: $InI_3$, or carbamates, such as indium diethyldithiocarbamate: $In[(SC(=S)N(C_2H_5)_2]_3$ and indium dimethyldithiocarbamate: $In[(SC(=S)N(CH_3)_2)]_3$, can be used, though the In material is not particularly limited thereto.

In the present embodiment, an organic indium compound or an inorganic indium compound is used as the Ga material. For example, gallium acetate: $Ga(OAc)_3$, gallium nitrate: $GaNO_3$, or gallium acetylacetonate: $Ga(acac)_3$ can be used, or alternatively, halides, such as gallium chloride: $GaCl_3$, gallium bromide: $GaBr_3$, and gallium iodide: $Ga_2I_3$, or carbamates, such as gallium diethyldithiocarbamate: $Ga[(SC(=S)N(C_2H_5)_2]_3$, can be used, though the Ga material is not particularly limited thereto.

In the present embodiment, the aforementioned In material or Ga material may be directly added to a reaction solution, but it is also possible to use an In material solution or a Ga material solution with a constant concentration obtained by dissolving the In material or Ga material in an organic solvent in advance.

In the present embodiment, an organic sulfur compound, such as a thiol, can be used as the S material. For example, octadecanethiol: $C_{18}H_{37}SH$, hexadecanethiol: $C_{16}H_{33}SH$, tetradecanethiol: $C_{14}H_{29}SH$, dodecanethiol: $C_{12}H_{25}SH$, decanethiol: $C_{10}H_{21}SH$, or octanethiol: $C_8H_{17}SH$ can be used.

When AgGaS or AgInGaS is synthesized, in particular, the type of the sulfur material used greatly influences the fluorescence properties. In the present embodiment, a S-ODE material obtained by dissolving sulfur in octadecene: ODE, a disulfide-based or thiuram-based S material, or S-OLAm/DDT obtained by dissolving S in oleylamine and dodecanethiol is preferably used. Among them, the S-ODE material can obtain a fluorescence FWHM of less than or equal to 40 nm and a fluorescence quantum yield of greater than or equal to 40%. Further, using disulfide can obtain more excellent properties. Examples of disulfide include diphenyl disulfide, dibenzyl disulfide, isopropyl xanthogen disulfide, and 4,4'-dithiodimorpholine. Furthermore, using a thiuram-based material can obtain even more excellent fluorescence properties. Examples of the thiuram-based material include thiuram disulfide, dipentamethylenethiuram tetrasulfide, tetraethylthiuram disulfide, and tetramethylthiuram disulfide. Apart from this, the S material may also be a material having multiple sulfur atoms linked together with the structure (—S—)n, or a material having a structure in which a nitrogen atom is added to the sulfur atom (N—S—), or a carbon atom is added to the sulfur atom (C—S—), for example.

In the present embodiment, an organic selenium compound (i.e., an organic chalcogen compound) can be used as the Se material. For example, trioctylphosphine selenide: $(C_8H_{17})_3P=Se$ obtained by dissolving selenium in trioctylphosphine, tributylphosphine selenide: $(C_4H_9)_3P=Se$ obtained by dissolving selenium in tributylphosphine, or a solution obtained by dissolving selenium in a high-boiling-point solvent of a long-chain hydrocarbon, such as octadecene, can be used.

When AgGaSe or AgInGaSe is synthesized, the type of the selenium material used greatly influences the fluorescence properties. In particular, a solution obtained by dissolving Se in a mixture of oleylamine and dodecanethiol (Se-OLAm/DDT) exhibits excellent light emission properties. Typical chalcopyrite-based quantum dots are confirmed to exhibit two types of light emission including a PL spectrum, which is considered as band-edge emission, and a PL spectrum, which is considered as defect emission, in the initial stage of light emission, and the light emission intensity ratio of band-edge emission/defect emission is often less than or equal to 10. When the reaction proceeds afterwards, it is often the case that the intensity of the defect emission gradually decreases, and along with this, the intensity of the band-edge emission increases. In contrast, when Se-DDT/OLAm is used as the Se source as in the present embodiment, a single peak is observed from the initial stage of light emission, and the ratio of band-edge emission/defect emission is greater than or equal to 10. Thus, few peaks that are considered to correspond to defect emission are confirmed. Further, the lifetime of fluorescence until it becomes 1/e is as short as 20 ns or less, and only the peak that corresponds to light emission other than defect emission can be confirmed in the initial stage of light emission.

In the present embodiment, an organic zinc compound or an inorganic zinc compound is used as the Zn material. The organic zinc compound and the inorganic zinc compound are materials that are stable and easy to handle even in the air. For example, the following organic zinc compound or inorganic zinc compound can be used, though the structure thereof is not particularly limited: acetates, such as zinc acetate: $Zn(OAc)_2$; zinc nitrate: $Zn(NO_3)_2$; fatty acid salts, such as zinc stearate: $Zn(OC(=O)C_{17}H_{35})_2$, zinc oleate: $Zn(OC(=O)C_{17}H_{33})_2$, zinc palmitate: $Zn(OC(=O)C_{15}H_{31})_2$, zinc myristate: $Zn(OC(=O)C_{13}H_{27})_2$, zinc dodecanoate: $Zn(OC(=O)C_{11}H_{23})_2$, and zinc acetylacetonate: $Zn(acac)_2$; halides, such as zinc chloride: $ZnCl_2$, zinc bromide: $ZnBr_2$, and zinc iodide: $ZnI_2$; and zinc carbamates, such as zinc diethyldithiocarbamate: $Zn(SC(=S)N(CH_2H_5)_2)_2$, zinc dimethyldithiocarbamate: $Zn(SC(=S)N(CH_3)_2)_2$, and zinc dibutyldithiocarbamate: $Zn(SC(=S)N(C_4H_9)_2)_2$.

In the present embodiment, quantum dots can be obtained through a one-pot synthesis without the need for isolation and purification of precursors.

In the present embodiment, the synthesized quantum dots exhibit fluorescence properties without being subjected to various processes, such as washing, isolated purification, coating treatment, or ligand exchange.

It should be noted that as illustrated in FIG. 1B, covering the core 5a of a nanocrystal with the shell 5b can further increase the fluorescence quantum yield.

In addition, after forming a core-shell structure, purifying the structure using a specific solvent can further increase the fluorescence quantum yield. Examples of the specific solvent include trioctylphosphine (TOP).

Further, in the present embodiment, centrifuging the synthesized reaction solution can obtain quantum dots with more excellent light emission properties.

Furthermore, in the present embodiment, mixing toluene, methanol, ethanol, acetone, and the like in the synthesized reaction solution and removing the resulting aggregates by centrifugation can obtain quantum dots with more excellent light emission properties.

In the method for producing the quantum dots of the present embodiment, after particles are formed in the initial stage of a reaction, predetermined elements are added thereto later to synthesize the quantum dots. Herein, the particles formed in the initial stage of a reaction preferably do not contain In. Specifically, when particles of AgGaS or AgGaSe not containing In are formed in the initial stage of a reaction, the best light emission properties are obtained.

Typical quantum dots contain In from the initial stage of a reaction, and the ratio of In/Ga is adjusted, for example. In contrast, the quantum dots according to the present embodiment are intended to have suppressed variations in the composition ratio of the materials used, and be synthesized from as fewer materials as possible. To this end, the quantum dots preferably do not contain In in the initial stage of a reaction. Consequently, it is estimated that a light emission property, such as a narrow fluorescence FWHM, can be obtained.

It should be noted that the green fluorescence-emitting quantum dots preferably contain In in the final stage, and are allowed to contain In during the course of the reaction. However, inclusion of In is not essential for the green fluorescence-emitting quantum dots, and for example, quantum dots containing AgGaS and not containing In have been confirmed to emit light, though the fluorescence FWHM thereof becomes wider to some extent.

In the present embodiment, when quantum dots are formed to contain Zn, Zn is preferably added with careful attention to the following points. First of all, Z is not added in the initial stage of a reaction but is added in the final step. This is because if the particles contain Zn, there is a possibility that defect emission may become dominant or only defect emission may be confirmed. Therefore, Zn is added in the final step to allow reactions to occur only on the surfaces of the particles. Second, Zn is added at a low temperature. The low temperature herein means a temperature of about 150 to 200° C. If the temperature at which Zn is added is high, Zn will react not only on the surfaces but also in the inside of the particles. Then, defect emission becomes likely to occur. Therefore, to allow Zn to react only on the surfaces of the particles, Zn is preferably added at a low temperature so that reactions will occur only on the surfaces of the particles.

In the present embodiment, when AgGaSe is synthesized, Se-OLAm/DDT is preferably used as the Se material. This can effectively suppress defect emission.

When AgGaS is synthesized also, not a commonly used material, which is obtained by dissolving sulfur powder in another material, is used, but thiuram-based material, such as tetraethylthiuram disulfide, in particular, is preferably used because such a material can obtain excellent light emission properties.

The centrifugation step is a step of separating large particles and small particles from each other. In particular, a step of performing centrifugation by adding toluene and ethanol can change the degree of aggregation of the quantum dots based on the difference in ligands on the surfaces of the quantum dots, by controlling the proportions of toluene and ethanol, even when the quantum dots are different in particle size. In such a case, the proportions of toluene and ethanol can be controlled to attain a ratio of the quantum dots: toluene:ethanol=1:0.5 to 2:0.5 to 2. It should be noted that methanol may be used instead of ethanol. Consequently, quantum dots with a high fluorescence quantum yield can be separated from quantum dots with a low fluorescence quantum yield. After that, adding TOP to the separated quantum dots can further increase the fluorescence quantum yield.

As described above, according to the method for producing the quantum dots of the present embodiment, Cd-free quantum dots with a narrow fluorescence FWHM and a high fluorescence quantum yield can be synthesized in a mass-producible manner.

Specific examples of the application of the quantum dot 5 illustrated in FIG. 1 include, but are not particularly limited to, the following.

Figure 2:
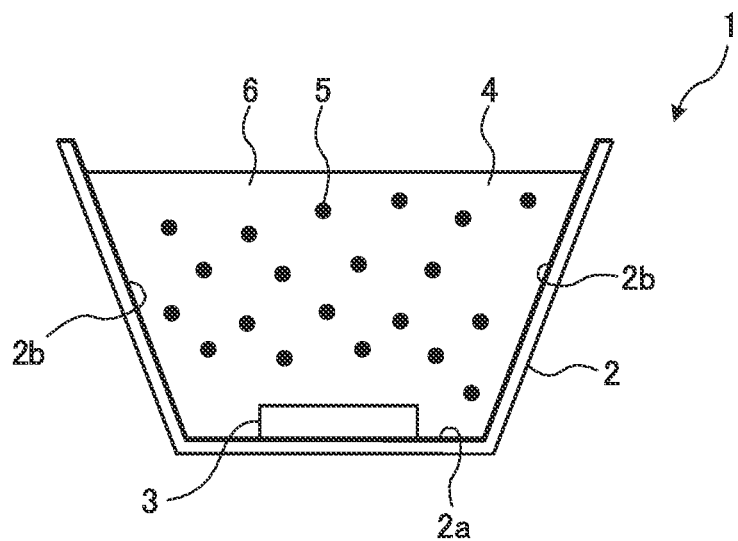
FIG. 2 is a schematic view of an LED apparatus including quantum dots according to an embodiment of the present invention.

FIG. 2 is a schematic view of an LED apparatus including the quantum dots of the present embodiment. An LED apparatus 1 of the present embodiment includes, as illustrated in FIG. 2, a housing case 2 having a bottom face 2a and a sidewall 2b surrounding the periphery of the bottom face 2a; an LED chip (i.e., a light emitting device) 3 disposed on the bottom face 2a of the housing case 2; and a fluorescent layer 4 that fills the housing case 2 and seals the upper face side of the LED chip 3. The "upper face side" herein is the direction in which light emitted from the LED chip 3 is released from the housing case 2, and indicates the direction on the side of the LED chip 3 opposite to the bottom face 2a.

The LED chip 3 is disposed on a base wiring circuit board (not illustrated), and the base wiring circuit board may form the bottom face portion of the housing case 2. Examples of the base wiring circuit board include a substrate of glass-epoxy resin or the like that has a wiring pattern formed thereon.

The LED chip 3 is a semiconductor device that emits light upon application of a voltage in the forward direction, and basically includes a p-type semiconductor layer and an n-type semiconductor layer joined together (i.e., a PN junction).

As illustrated in FIG. 2, the fluorescent layer 4 is formed of resin 6 in which a large number of quantum dots 5 are dispersed.

The resin composition having dispersed therein the quantum dots 5 according to the present embodiment may include the quantum dots 5 and a fluorescent material different from the quantum dots 5. Examples of the fluorescent material include, but are not particularly limited to, a SiAlON-based or KSF ($K_2SiF_6$: $Mn^{4+}$) red fluorescent material.

Examples of materials that can be used for the resin 6 to form the fluorescent layer 4 include, but are not particularly limited to, polypropylene (PP), polystyrene (PS), acrylic resin, methacrylate resin, MS resin, polyvinyl chloride (PVC), polycarbonate (PC), polyethylene terephthalate (PET), polyethylene naphthalate (PEN), polymethylpentene, liquid crystal polymers, epoxy resin, silicone resin, and a mixture thereof.

The LED apparatus including the quantum dots of the present embodiment can be applied to a display apparatus.

Figure 3:
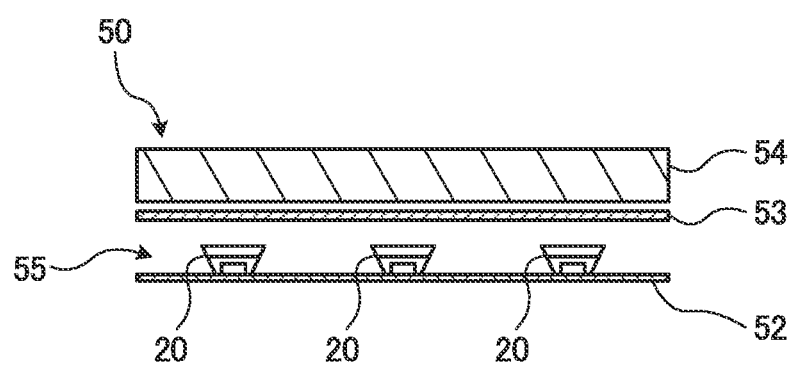
FIG. 3 is a longitudinal sectional view of a display apparatus including an LED apparatus according to an embodiment of the present invention.

FIG. 3 is a longitudinal sectional view of a display apparatus including the LED apparatus illustrated in FIG. 2. As illustrated in FIG. 3, a display apparatus 50 includes a plurality of LED apparatuses 20 and a display unit 54, such as a liquid crystal display, disposed facing the LED apparatuses 20. Each LED apparatus 20 is disposed on the rear face side of the display unit 54. Each LED apparatus 20 has a structure in which an LED chip is sealed with resin having a large number of quantum dots 5 dispersed therein as with the LED apparatus 1 illustrated in FIG. 2.

As illustrated in FIG. 3, the plurality of LED apparatuses 20 are supported on a support base 52. The LED apparatuses 20 are arranged with predetermined gaps therebetween. The LED apparatuses 20 and the support base 52 form a backlight 55 for the display unit 54. The shape and material of the support base 52 are not particularly limited to, for example, the shape of a sheet, plate, or case. As illustrated in FIG. 3, a light diffusion plate 53 and the like may be provided between the backlight 55 and the display unit 54.

Applying the quantum dots 5 with a narrow fluorescence FWHM of the present embodiment to the LED apparatus illustrated in FIG. 2 or the display apparatus illustrated in FIG. 3, for example, can effectively improve the light emission properties of the apparatus.

In addition, a resin composition obtained by dispersing the quantum dots 5 of the present embodiment in resin can be formed in a sheet form or film form. Such a sheet or film can be incorporated in a backlight apparatus, for example.

EXAMPLES

Hereinafter, the advantages effects of the present invention will be described by way of Examples and Comparative Examples of the present invention. It should be noted that the present invention is not limited by the following Examples by any means.

<Materials>

For the experiments, the following materials were used to synthesize quantum dots containing $AgIn_xGa_{1-x}S_ySe_{1-y}$ or $ZnAgIn_xGa_{1-x}S_ySe_{1-y}$ (where $0 \leq X < 1$ and $0 \leq Y \leq 1$).

(Solvents)
Octadecene: manufactured by Sigma-Aldrich Co. LLC.
Oleylamine: manufactured by Kao Corporation
Dodecanethiol: manufactured by Kao Corporation
Oleic acid: LUNAC O-V manufactured by Kao Corporation
Trioctylphosphine: manufactured by HOKKO CHEMICAL INDUSTRY CO., LTD.

(Silver Material)
Silver acetate: manufactured by Sigma-Aldrich Co. LLC.

(Indium Material)
Indium acetate: manufactured by Shinko Chemical Co., Ltd.
Indium diethyldithiocarbamate: Synthetic material prepared by the inventors (Gallium Material)
Gallium chloride: manufactured by Shinko Chemical Co., Ltd.
Gallium acetylacetonate: manufactured by Tokyo Chemical Industry Co., Ltd.

(Sulfur Material)
Sulfur: manufactured by KISHIDA CHEMICAL Co., Ltd.
Tetraethylthiuram disulfide: manufactured by SANSHIN CHEMICAL INDUSTRY CO., LTD.
Dipentamethylenethiuram tetrasulfide: manufactured by SANSHIN CHEMICAL INDUSTRY CO., LTD.
Isopropyl xanthogen disulfide: manufactured by SANSHIN CHEMICAL INDUSTRY CO., LTD.
Tetramethylthiuram disulfide: manufactured by SANSHIN CHEMICAL INDUSTRY CO., LTD.

<Measuring Instrument>
Fluorescence spectrophotometer: F-2700 manufactured by JASCO Corporation
UV-Visible/NIR spectrophotometer: V-770 manufactured by Hitachi High-Tech Corporation
Quantum efficiency measurement system: QE-1100 manufactured by Otsuka Electronics Co., Ltd.
Scanning electron microscope (SEM): SU9000 manufactured by Hitachi High-Tech Corporation Example 1

1.5 mL of a 0.2 M solution obtained by dissolving silver acetate: Ag(OAc) in oleylamine: OLAm, 165 mg of gallium acetylacetonate: Ga(acac)$_3$, 28.5 mL of oleylamine: OLAm, and 1.5 mL of dodecanethiol: DDT were put into a 300 mL reaction container. These materials were heated while being stirred in an inert gas (N$_2$) atmosphere and thus were dissolved.

The solution was dissolved at 120° C. for 5 minutes, and 1.5 mL of a 0.4 M solution obtained by dissolving tetraethylthiuram disulfide (TETDS) in oleylamine: OLAm was added thereto. After that, the temperature of the solution was increased from 120 to 200° C., and the solution was stirred for a total of 20 minutes. Then, the obtained reaction solution was cooled down to room temperature.

125.7 mg of indium diethyldithiocarbamate: In[SC(=S)N(C$_2$H$_5$)$_2$]$_3$ was added as a carbamate to the obtained reaction solution, and the solution was heated again while being stirred at 270° C. for 10 minutes.

After that, 13.5 mL of a solution, which had been obtained by mixing 9 mL of a 0.1 M solution obtained by dissolving gallium chloride: GaCl$_3$ and myristic acid: MA in octadecene: ODE to attain a molar ratio of Ga:MA=1:3 and 4.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 539 nm, a fluorescence FWHM of 35 nm, and a fluorescence quantum yield of 49% were obtained.

Figure 4:
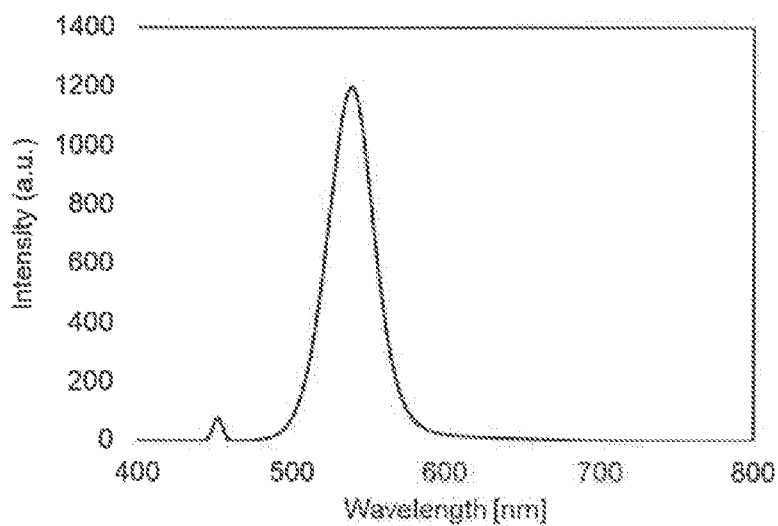
FIG. 4 illustrates the fluorescence (i.e., photoluminescence: PL) spectrum of AgInGaS of Example 1.

After that, an operation of washing the reaction solution using toluene and ethanol and re-dispersing the QDs in the solution using TOP was performed twice, and the resulting QD-dispersed solution was measured with a fluorescence spectrophotometer. Consequently, as illustrated in FIG. 4, optical properties including a fluorescence wavelength of 539 nm, a fluorescence FWHM of 35.4 nm, and a quantum yield of 75% were obtained.

Example 2

0.5 mL of a 0.2 M solution obtained by dissolving silver acetate: Ag (OAc) in oleylamine: OLAm, 55 mg of gallium acetylacetonate: Ga(acac)$_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 120° C. for 5 minutes, and 0.5 mL of a 0.4 M solution obtained by dissolving dipentamethylenethiuram tetrasulfide (DPTT) in oleylamine: OLAm was added thereto. After that, the temperature of the solution was increased from 120 to 200° C., and the solution was stirred for a total of 20 minutes. Then, the obtained reaction solution was cooled down to room temperature.

41.9 mg of indium diethyldithiocarbamate: In[SC(=S)N$(C_2H_5)_2]_3$ was added as a carbamate to the obtained reaction solution, and the solution was heated again while being stirred at 270° C. for 10 minutes.

After that, 4.5 mL of a solution, which had been obtained by mixing 3 mL of a 0.1 M solution obtained by dissolving gallium chloride: $GaCl_3$ and myristic acid: MA in octadecene: ODE to attain a molar ratio of Ga:MA=1:3 and 1.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 526 nm, a fluorescence FWHM of 35.5 nm, and a quantum yield of 34% were obtained.

Figure 5:
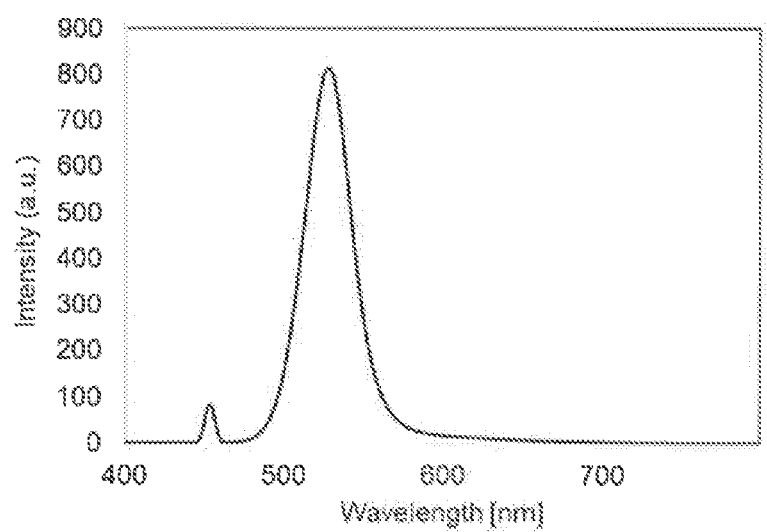
FIG. 5 illustrates the PL spectrum of AgInGaS of Example 2.

After that, an operation of washing the reaction solution using toluene and ethanol and re-dispersing the QDs in the solution using TOP was performed twice, and the resulting QD-dispersed solution was measured with a fluorescence spectrophotometer. Consequently, as illustrated in FIG. 5, optical properties including a fluorescence wavelength of 526.5 nm, a fluorescence FWHM of 34.8 nm, and a quantum yield of 54% were obtained.

Example 3

0.5 mL of a 0.2 M solution obtained by dissolving silver acetate: Ag(OAc) in oleylamine: OLAm, 55 mg of gallium acetylacetonate: Ga(acac)$_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 120° C. for 5 minutes, and 0.5 mL of a 0.4 M solution obtained by dissolving 4,4'-dithiodimorpholine (DTDM) in oleylamine: OLAm was added thereto. After that, the temperature of the solution was increased from 120 to 200° C., and the solution was stirred for a total of 20 minutes. Then, the obtained reaction solution was cooled down to room temperature.

41.9 mg of indium diethyldithiocarbamate: In[SC(=S)N$(C_2H_5)_2]_3$ was added as a carbamate to the obtained reaction solution, and the solution was heated again while being stirred at 270° C. for 10 minutes.

After that, 4.5 mL of a solution, which had been obtained by mixing 3 mL of a 0.1 M solution obtained by dissolving gallium chloride: $GaCl_3$ and myristic acid: MA in octadecene: ODE to attain a molar ratio of Ga:MA=1:3 and 1.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 526 nm, a fluorescence FWHM of 37.5 nm, and a quantum yield of 41% were obtained.

Figure 6:
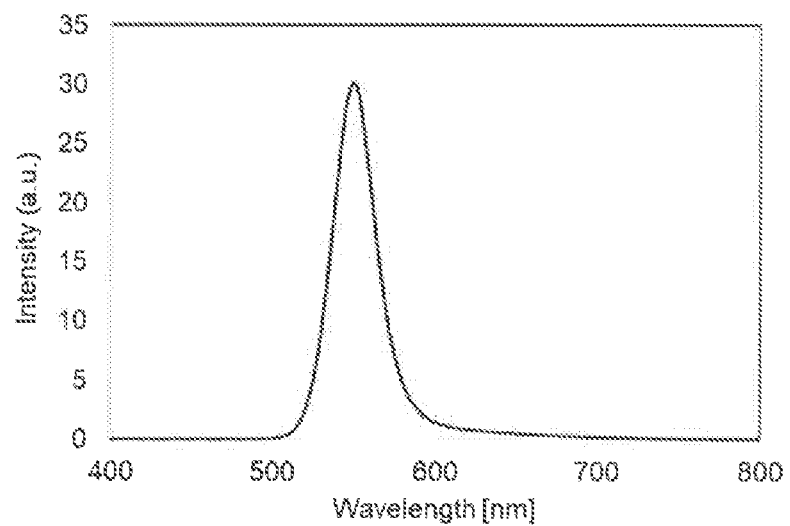
FIG. 6 illustrates the PL spectrum of AgInGaS of Example 3.

After that, an operation of washing the reaction solution using toluene and ethanol and re-dispersing the QDs in the solution using TOP was performed twice, and the resulting QD-dispersed solution was measured with a fluorescence spectrophotometer. Consequently, as illustrated in FIG. 6, optical properties including a fluorescence wavelength of 527.5 nm, a fluorescence FWHM of 36.9 nm, and a quantum yield of 56% were obtained.

Example 4

0.5 mL of a 0.2 M solution obtained by dissolving silver acetate: Ag(OAc) in oleylamine: OLAm, 55 mg of gallium acetylacetonate: Ga(acac)$_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 120° C. for 5 minutes, and 0.5 mL of a 0.4 M solution obtained by dissolving isopropyl xanthogen disulfide in oleylamine: OLAm was added thereto. After that, the temperature of the solution was increased from 120 to 200° C., and the solution was stirred for a total of 20 minutes. Then, the obtained reaction solution was cooled down to room temperature.

41.9 mg of indium diethyldithiocarbamate: In[SC(=S)N$(C_2H_5)_2]3$ was added as a carbamate to the obtained reaction solution, and the solution was heated again while being stirred at 270° C. for 10 minutes.

After that, 4.5 mL of a solution, which had been obtained by mixing 3 mL of a 0.1 M solution obtained by dissolving gallium chloride: $GaCl_3$ and myristic acid: MA in octadecene: ODE to attain a molar ratio of Ga:MA=1:3 and 1.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 530 nm, a fluorescence FWHM of 37 nm, and a quantum yield of 40% were obtained.

Figure 7:
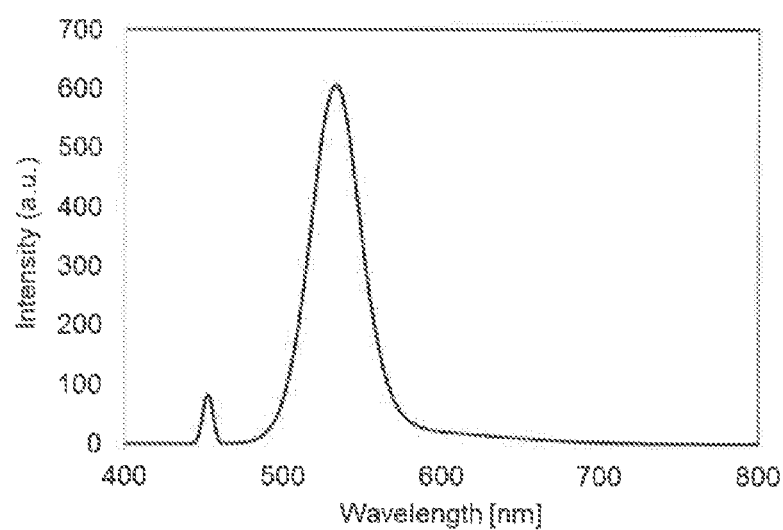
FIG. 7 illustrates the PL spectrum of AgInGaS of Example 4.

After that, an operation of washing the reaction solution using toluene and ethanol and re-dispersing the QDs in the solution using TOP was performed twice, and the resulting QD-dispersed solution was measured with a fluorescence spectrophotometer. Consequently, as illustrated in FIG. 7, optical properties including a fluorescence wavelength of 532 nm, a fluorescence FWHM of 36.9 nm, and a quantum yield of 65% were obtained.

Example 5

0.5 mL of a 0.2 M solution obtained by dissolving silver acetate: Ag(OAc) in oleylamine: OLAm, 55 mg of gallium acetylacetonate: Ga(acac)$_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 120° C. for 5 minutes, and 0.5 mL of a 0.4 M solution obtained by dissolving tetramethylthiuram disulfide (TMTDS) in oleylamine: OLAm was added thereto. After that, the temperature of the solution was increased from 120 to 200° C., and the solution was stirred for a total of 20 minutes. Then, the obtained reaction solution was cooled down to room temperature.

41.9 mg of indium diethyldithiocarbamate: $In[SC(=S)N(C_2H_5)_2]_3$ was added as a carbamate to the obtained reaction solution, and the solution was heated again while being stirred at 270° C. for 10 minutes.

After that, 4.5 mL of a solution, which had been obtained by mixing 3 ml of a 0.1 M solution obtained by dissolving gallium chloride: $GaCl_3$ and myristic acid: MA in octadecene: ODE to attain a molar ratio of Ga:MA=1:3 and 1.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 542 nm, a fluorescence FWHM of 36.5 nm, and a quantum yield of 54% were obtained.

Figure 8:
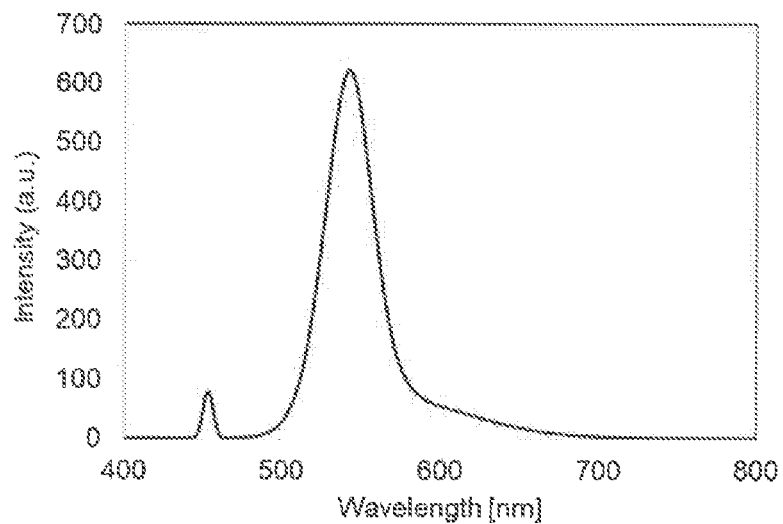
FIG. 8 illustrates the PL spectrum of AgInGaS of Example 5.

After that, an operation of washing the reaction solution using toluene and ethanol and re-dispersing the QDs in the solution using TOP was performed twice, and the resulting QD-dispersed solution was measured with a fluorescence spectrophotometer. Consequently, as illustrated in FIG. 8, optical properties including a fluorescence wavelength of 542 nm, a fluorescence FWHM of 36.5 nm, and a quantum yield of 71% were obtained.

Example 6

0.5 mL of a 0.2 M solution obtained by dissolving silver acetate: Ag(OAc) in oleylamine: OLAm, 55 mg of gallium acetylacetonate: $Ga(acac)_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 120° C. for 5 minutes, and 0.5 mL of a 0.4 M solution obtained by dissolving tetraethylthiuram disulfide (TETDS) in oleylamine: OLAm was added thereto. After that, the temperature of the solution was increased from 120 to 200° C., and the solution was stirred for a total of 20 minutes. Then, the obtained reaction solution was cooled down to room temperature.

41.9 mg of indium diethyldithiocarbamate: $In[SC(=S)N(C_2H_5)_2]_3$ was added as a carbamate to the obtained reaction solution, and the solution was heated again while being stirred at 270° C. for 10 minutes.

After that, 4.5 mL of a solution, which had been obtained by mixing 3 mL of a 0.1 M solution obtained by mixing gallium chloride: $GaCl_3$ and oleic acid: OLAc in octadecene: ODE to attain a molar ratio of Ga:MA=1:3 and 1.5 ml of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 546 nm, a fluorescence FWHM of 29.3 nm, and quantum yield of 39% were obtained.

Figure 9:
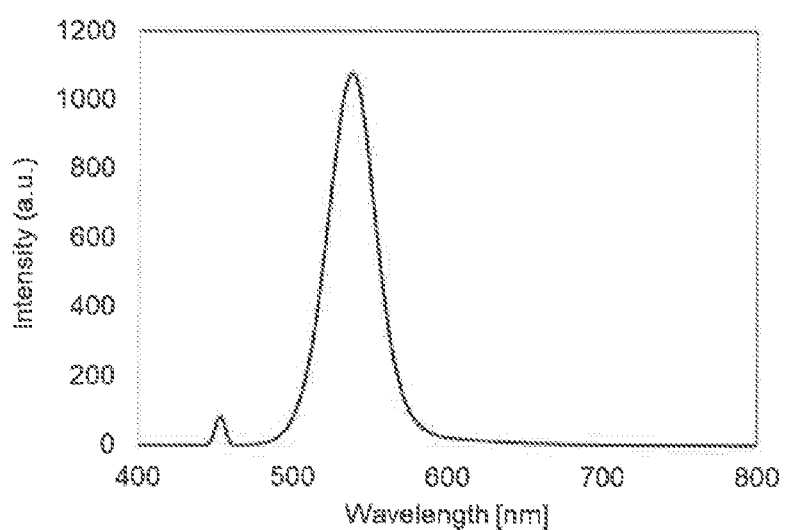
FIG. 9 illustrates the PL spectrum of AgInGaS of Example 6.

After that, an operation of washing the reaction solution using toluene and ethanol and re-dispersing the QDs in the solution using TOP was performed twice, and the resulting QD-dispersed solution was measured with a fluorescence spectrophotometer. Consequently, as illustrated in FIG. 9, optical properties including a fluorescence wavelength of 548.5 nm, a fluorescence FWHM of 30.5 nm, and a quantum yield of 59% were obtained.

Example 7

0.5 mL of a 0.2 M solution obtained by dissolving silver acetate: Ag(OAc) in oleylamine: OLAm, 55 mg of gallium acetylacetonate: $Ga(acac)_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 120° C. for 5 minutes, and 0.5 mL of a 0.4 M solution obtained by dissolving tetraethylthiuram disulfide in oleylamine: OLAm was added thereto. After that, the temperature of the solution was increased from 120 to 200° C., and the solution was stirred for a total of 20 minutes. Then, the obtained reaction solution was cooled down to room temperature.

21.8 mg of indium acetate: $In(OAc)_3$ and 0.75 mL of a 0.2 M solution obtained by dissolving sulfur: S in octadecene: ODE were added to the obtained reaction solution, and then, the solution was heated while being stirred at 270° C. for 10 minutes.

After that, 4.5 mL of a solution, which had been obtained by mixing 3 mL of a 0.1 M solution obtained by dissolving gallium chloride: $GaCl_3$ and myristic acid: MA in octadecene: ODE to attain a molar ratio of Ga:MA=1:3 and 1.5 mL of 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 546 nm, a fluorescence FWHM of 36.5 nm, and a quantum yield of 55% were obtained.

Figure 10:
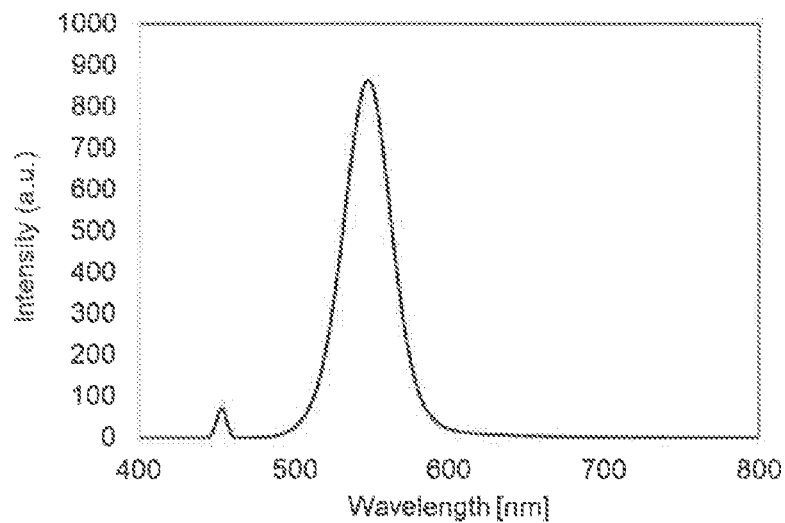
FIG. 10 illustrates the PL spectrum of AgInGaS of Example 7.

After that, an operation of washing the reaction solution using toluene and ethanol and re-dispersing the QDs in the solution using TOP was performed twice, and the resulting QD-dispersed solution was measured with a fluorescence spectrophotometer. Consequently, as illustrated in FIG. 10, optical properties including a fluorescence wavelength of 546.5 nm, a fluorescence FWHM of 36.2 nm, and a quantum yield of 81% were obtained.

Example 8

0.5 mL of a 0.2 M solution obtained by dissolving silver acetate: Ag(OAc) in oleylamine: OLAm, 55 mg of gallium acetylacetonate: Ga(acac)$_3$, 9.5 mL of oleylamine: OLAm, and 0.5 mL of dodecanethiol: DDT were put into a 100 mL reaction container. These materials were heated while being stirred in an inert gas (N$_2$) atmosphere and thus were dissolved.

The solution was dissolved at 120° C. for 5 minutes, and 1 mL of a 0.2 M solution obtained by dissolving sulfur: S in octadecene: ODE (S-ODE) was added thereto. After that, the temperature of the solution was increased from 120 to 200° C., and the solution was stirred for a total of 20 minutes. Then, the obtained reaction solution was cooled down to room temperature.

21.8 mg of indium acetate: In(OAc)$_3$ and 2.25 ml of 0.2 M S-ODE were added to the obtained reaction solution, and the solution was heated again while being stirred at 270° C. for 10 minutes.

After that, 4.5 mL of a solution, which had been obtained by mixing 3 mL of a 0.1 M solution obtained by dissolving gallium chloride: GaCl$_3$ and myristic acid: MA in octadecene: ODE to attain a molar ratio of Ga:MA=1:3 and 1.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 523 nm, a fluorescence FWHM of 36.5 nm, and a quantum yield of 25% were obtained.

After that, an operation of washing the reaction solution using toluene and ethanol and re-dispersing the QDs in the solution using TOP was performed twice, and the resulting QD-dispersed solution was measured with a fluorescence spectrophotometer. Consequently, optical properties including a fluorescence wavelength of 522 nm, a fluorescence FWHM of 38 nm, and a quantum yield of 46% were obtained.

Example 9

0.5 mL of a 0.2 M solution obtained by dissolving silver acetate: Ag(OAc) in oleylamine: OLAm, 55 mg of gallium acetylacetonate: Ga(acac)$_3$, 9.5 mL of oleylamine: OLAm, and 0.5 mL of dodecanethiol: DDT were put into a 100 mL reaction container. These materials were heated while being stirred in an inert gas (N$_2$) atmosphere and thus were dissolved.

The solution was dissolved at 120° C. for 5 minutes, and 1 mL of a 0.2 M solution obtained by dissolving sulfur: S in octadecene: ODE (S-ODE) was added thereto. After that, the temperature of the solution was increased from 120 to 200° C., and the solution was stirred for a total of 20 minutes. Then, the obtained reaction solution was cooled down to room temperature.

41.9 mg of indium diethyldithiocarbamate: In[SC(=S)N(C$_2$H$_5$)$_2$]$_3$ was added as a carbamate to the obtained reaction solution, and the solution was heated again while being stirred at 270° C. for 10 minutes.

After that, 4.5 mL of a solution, which had been obtained by mixing 3 mL of a 0.1 M solution obtained by dissolving gallium chloride: GaCl$_3$ and myristic acid: MA in octadecene: ODE to attain a molar ratio of Ga:MA=1:3 and 1.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

The obtained reaction solution was measured with a fluorescence spectrophotometer. Consequently, optical properties including a fluorescence wavelength of 534 nm, a fluorescence FWHM of 36 nm, and a quantum yield of 33% were obtained.

After that, an operation of washing the reaction solution using toluene and ethanol and re-dispersing the QDs in the solution using TOP was performed twice, and the resulting QD-dispersed solution was measured with a fluorescence spectrophotometer. Consequently, optical properties including a fluorescence wavelength of 534 nm, a fluorescence FWHM of 40 nm, and a quantum yield of 45% were obtained.

Example 10

0.5 mL of a 0.2 M solution obtained by dissolving silver acetate: Ag(OAc) in oleylamine: OLAm, 73.4 mg of gallium acetylacetonate: Ga(acac)$_3$, 9.5 mL of oleylamine: OLAm, and 0.3 mL of dodecanethiol: DDT were put into a 100 mL reaction container. These materials were heated while being stirred in an inert gas (N$_2$) atmosphere and thus were dissolved.

The solution was dissolved at 120° C. for 5 minutes, and 0.5 mL of a 0.4 M solution obtained by dissolving tetraethylthiuram disulfide (TETDS) in oleylamine: OLAm was added thereto. After that, the temperature of the solution was increased from 120 to 200° C., and the solution was stirred for a total of 20 minutes. Then, the obtained reaction solution was cooled down to room temperature.

0.375 mL of a 0.2 M solution obtained by dissolving indium acetate: In(OAc)3 in oleylamine: OLAm and oleic acid: OLAc, and 1.225 mL of a 0.2 M solution obtained by dissolving sulfur: S in octadecene: ODE were added to the obtained reaction solution, and the solution was heated again while being stirred at 270° C. for 10 minutes.

After that, 4.5 mL of a solution, which had been obtained by mixing 3 mL of a 0.1 M solution obtained by dissolving gallium chloride: GaCl$_3$ and oleic acid: OLAc in octadecene: ODE to attain a molar ratio of Ga:OLAc=1:1.5 and 1.5 mL of a 0.2 M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

After that, 3 mL of TOP was added to the reaction solution, which was then heated at 200° C. for 10 minutes. Then, the obtained reaction solution was cooled down to room temperature. After that, the reaction solution was washed with toluene and ethanol, and QDs were re-dispersed in the solution with toluene. The resulting QD-dispersed solution was measured with a fluorescence spectrophotometer. Consequently, optical properties including a fluorescence wavelength of 536.5 nm, a fluorescence FWHM of 29.4 nm, and a quantum yield of 71% were obtained.

Example 11

0.5 mL of a 0.2 M solution obtained by dissolving silver acetate: Ag(OAc) in oleylamine: OLAm, 91.8 mg of gallium acetylacetonate: $Ga(acac)_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 200° C. for 5 minutes, and 1 mL of a 0.4 M solution obtained by dissolving tetraethylthiuram disulfide (TETDS) in oleylamine: OLAm was added thereto. Then, the solution was heated while being stirred for 40 minutes. Then, the obtained reaction solution was cooled down to room temperature.

0.375 mL of a 0.2 M solution obtained by dissolving indium acetate: $In(OAc)_3$ in oleylamine: OLAm and oleic acid: OLAc, and 0.375 mL of a 0.2 M solution obtained by dissolving sulfur: S in octadecene: ODE were added to the obtained reaction solution, and the solution was heated again while being stirred at 270° C. for 10 minutes.

The obtained reaction solution was washed with 3 mL of toluene and 30 mL of ethanol, and QDs were re-dispersed in the solution with 10 mL of OLAm.

After that, 4.5 mL of a solution, which had been obtained by mixing 3 mL of a 0.1 M solution obtained by dissolving gallium chloride: $GaCl_3$ and oleic acid: OLAc in octadecene: ODE to attain a molar ratio of Ga:OLAc=1:1.5 and 1.5 mL of a 0.2M solution obtained by dissolving sulfur: S in octadecene: ODE, was dropped for 50 minutes onto the solution that was heated while being stirred at 270° C. After the completion of dropping of the solution, the solution was heated while being stirred for 70 minutes, and then, the obtained reaction solution was cooled down to room temperature.

Figure 11:
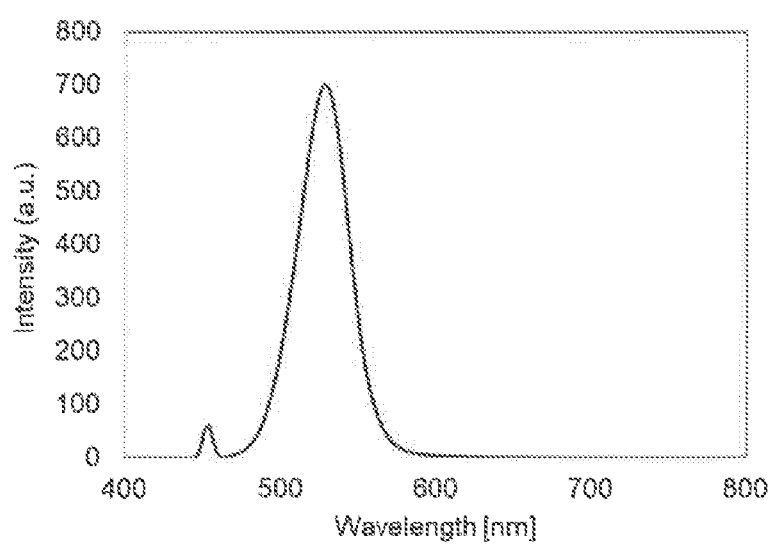
FIG. 11 illustrates the PL spectrum of AgInGaS of Example 11.

After that, 3 mL of TOP was added to the reaction solution, which was then heated at 200° C. for 10 minutes. Then, the obtained reaction solution was cooled down to room temperature. After that, the reaction solution was washed with toluene and ethanol, and QDs were re-dispersed in the solution with TOP. The resulting QD-dispersed solution was measured with a fluorescence spectrophotometer. Consequently, as illustrated in FIG. 11, optical properties including a fluorescence wavelength of 530.5 nm, a fluorescence FWHM of 38 nm, and quantum yield of 86% were obtained.

Example 12

0.5 mL of a 0.2 M solution obtained by dissolving silver acetate: Ag(OAc) in oleylamine: OLAm, 55 mg of gallium acetylacetonate: $Ga(acac)_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 200° C. for 5 minutes, and 0.5 mL of a 0.4 M solution obtained by dissolving tetraethylthiuram disulfide (TETDS) in oleylamine: OLAm was added thereto. Then, the solution was heated while being stirred at 200° C. for 40 minutes. After that, the obtained reaction solution was cooled down to room temperature.

0.375 mL of a 0.2 M solution obtained by dissolving indium acetate: $In(OAc)_3$ in octadecene: ODE and oleic acid: OLAc, and 1.125 mL of a 0.2 M solution obtained by dissolving sulfur: S in octadecene: ODE were added to the obtained reaction solution, and the solution was heated again while being stirred at 300° C. for 10 minutes.

After that, a solution, which had been obtained by mixing 3 mL of a 0.1 M solution obtained by dissolving gallium chloride: $GaCl_3$ and oleic acid: OLAc in octadecene: ODE to attain a molar ratio of Ga:OLAc=1:3, 1.5 mL of a 0.2 M solution obtained by dissolving sulfur: S in octadecene: ODE, and 0.141 mL of oleylamine: OLAm, was dropped for 50 minutes onto the solution that was heated while being stirred at 300° C. After the completion of dropping of the solution, the solution was heated while being stirred for 20 minutes, and then, the obtained reaction solution was cooled down to room temperature.

After that, 1.5 mL of a 0.2 M solution obtained by dissolving sulfur: S in octadecene: ODE was added to the reaction solution, which was then heated while being stirred at 200° C. for 30 minutes. Then, the obtained reaction solution was cooled down to room temperature.

After that, the reaction solution was subjected to centrifugation at 5500 rpm for 3 minutes using a centrifugal separator, and the supernatant liquid was recovered. Then, 3 mL of TOP was added to the recovered supernatant liquid, which was then heated at 200° C. for 10 minutes, and then, the obtained reaction solution was cooled down to room temperature.

Figure 12:
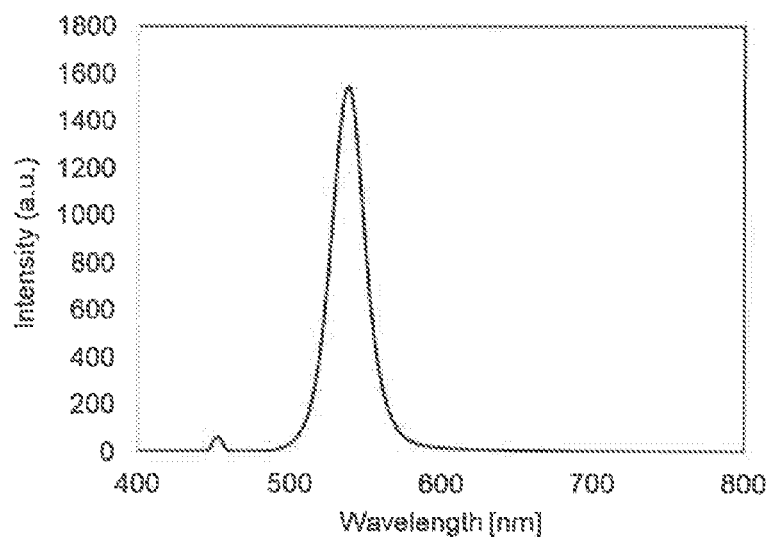
FIG. 12 illustrates the PL spectrum of AgInGaS of Example 12.

After that, 1 mL of toluene and 1.5 mL of ethanol were added to 1 mL of the reaction solution, which was then subjected to centrifugation. Then, 2 mL of ethanol was added to the supernatant liquid, which was then subjected to centrifugation (i.e., washing separation) at 5500 rpm for 3 minutes, and QDs were re-dispersed in the solution with toluene. The resulting QD-dispersed solution was measured with a fluorescence spectrophotometer. It should be noted that the washing separation indicates a step of separating the quantum dots by controlling the degree of aggregation of the quantum dots based on the difference in ligands coordinated to the quantum dots, by controlling the proportions of toluene and ethanol. Performing centrifugation and washing separation can recover only the quantum dots that have ligands coordinated thereto with good balance and thus can obtain excellent light emission properties (i.e., a high quantum yield). Consequently, as illustrated in FIG. 12, optical properties including a fluorescence wavelength of 537.5 nm, a fluorescence FWHM of 25 nm, and a quantum yield of 63% were obtained.

Example 13

0.5 mL of a 0.2 M solution obtained by dissolving silver acetate: Ag(OAc) in oleylamine: OLAm, 73.4 mg of gallium acetylacetonate: $Ga(acac)_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 200° C. for 5 minutes, and 0.5 mL of a 0.4 M solution obtained by dissolving tetraethylthiuram disulfide (TETDS) in oleylamine: OLAm was added thereto. Then, the solution was heated while being stirred at 200° C. for 40 minutes. After that, the obtained reaction solution was cooled down to room temperature.

0.6 mL of a 0.2 M solution obtained by dissolving indium acetate: $In(OAc)_3$ in octadecene: ODE and oleic acid: OLAc, and 1.8 mL of a 0.2 M solution obtained by dissolving sulfur: S in octadecene: ODE were added to the obtained reaction solution, and the solution was heated again while being stirred at 290° C. for 10 minutes.

After that, a solution, which had been obtained by mixing 3.6 mL of a 0.1 M solution obtained by dissolving gallium chloride: $GaCl_3$ and oleic acid: OLAc in octadecene: ODE to attain a molar ratio of Ga:OLAc=1:3, 1.8 mL of a 0.2 M solution obtained by dissolving sulfur: S in octadecene:

ODE, and 2.7 mL of oleylamine: OLAm, was dropped for 80 minutes onto the solution that was heated while being stirred at 290° C. After the completion of dropping of the solution, the solution was heated while being stirred for 10 minutes, and then, the obtained reaction solution was cooled down to room temperature.

After that, the reaction solution was subjected to centrifugation at 5500 rpm for 3 minutes using a centrifugal separator, and the supernatant liquid was recovered. 3 mL of TOP was added to the recovered supernatant liquid, which was then heated at 180° C. for 10 minutes, and then, the obtained reaction solution was cooled down to room temperature.

Figure 13:
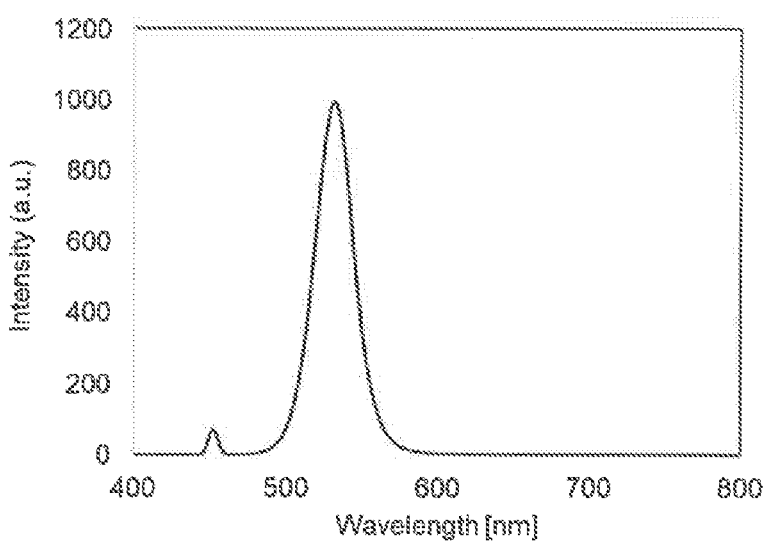
FIG. 13 illustrates the PL spectrum of AgInGaS of Example 13.

After that, 1 mL of toluene and 1.5 mL of ethanol were added to 1 mL of the reaction solution, which was then subjected to centrifugation. Then, 2 mL of ethanol was added to the supernatant liquid, which was then subjected to centrifugation at 5500 rpm for 3 minutes, and QDs were re-dispersed in the solution with toluene. The resulting QD-dispersed solution was measured with a fluorescence spectrophotometer. Consequently, as illustrated in FIG. 13, optical properties including a fluorescence wavelength of 531.0 nm, a fluorescence FWHM of 29.3 nm, and a quantum yield of 85% were obtained.

Example 14

0.5 mL of a 0.2 M solution obtained by dissolving silver acetate: Ag(OAc) in oleylamine: OLAm, 73.4 mg of gallium acetylacetonate: $Ga(acac)_3$, 9.5 mL of oleylamine: OLAm, and 0.5 mL of dodecanethiol: DDT were put into a 100 mL reaction container. These materials were heated while being stirred in an inert gas ($N_2$) atmosphere and thus were dissolved.

The solution was dissolved at 200° C. for 5 minutes, and 0.5 mL of a 0.4 M solution obtained by dissolving tetraethylthiuram disulfide (TETDS) in oleylamine: OLAm was added thereto. Then, the solution was heated while being stirred at 200° C. for 40 minutes. After that, the obtained reaction solution was cooled down to room temperature.

0.5 mL of a 0.2 M solution obtained by dissolving indium acetate: $In(OAc)_3$ in octadecene: ODE and oleic acid: OLAc, and 1.5 mL of a 0.2 M solution obtained by dissolving sulfur: S in octadecene: ODE were added to the obtained reaction solution, and the solution was heated again while being stirred at 290° C. for 10 minutes.

After that, 3 mL of a 0.1 M solution obtained by dissolving gallium chloride: $GaCl_3$ and oleic acid: OLAc in oleylamine: OLAm to attain a molar ratio of Ga:OLAc=1:3, 0.5 mL of a 0.4 M solution obtained by dissolving tetraethylthiuram disulfide (TETDS) in oleylamine: OLAm, and 3 mL of oleylamine: OLAm were dropped for 80 minutes onto the solution that was heated while being stirred at 290° C. After the completion of dropping of the solution, the solution was heated while being stirred for 10 minutes, and then, the obtained reaction solution was cooled down to room temperature.

After that, the reaction solution was subjected to centrifugation at 5500 rpm for 3 minutes using a centrifugal separator, and the supernatant liquid was recovered. 3 mL of TOP was added to the recovered supernatant liquid, which was then heated at 180° C. for 10 minutes. Then, the obtained reaction solution was cooled down to room temperature.

1 mL of toluene and 1.5 mL of ethanol were added to 1 mL of the obtained reaction solution, which was then subjected to centrifugation at 5500 rpm for 3 minutes. After that, 2 mL of ethanol was added to the supernatant liquid, which was then subjected to centrifugation at 5500 rpm for 3 minutes, and QDs were re-dispersed in the solution with toluene. The resulting QD-dispersed solution was measured with a fluorescence spectrophotometer. Consequently, optical properties including a fluorescence wavelength of 529.5 nm, a fluorescence FWHM of 30.8 nm, and a quantum yield of 71% were obtained.

After that, the obtained reaction solution was heated at 200° C. for 5 minutes. Then, 2 mL of a solution, which had been obtained by mixing 0.075 mL of a 0.8 M solution obtained by dissolving zinc acetate: $Zn(OAc)_2$ in oleic acid: OLAc and trioctylphosphine: TOP, 0.6 mL of a 0.2 M solution obtained by dissolving sulfur: S in trioctylphosphine: TOP, and 1.325 mL of oleylamine: OLAm, was dropped for 120 minutes onto the solution that was heated while being stirred at 200° C., and the obtained reaction solution was cooled down to room temperature.

Figure 14:
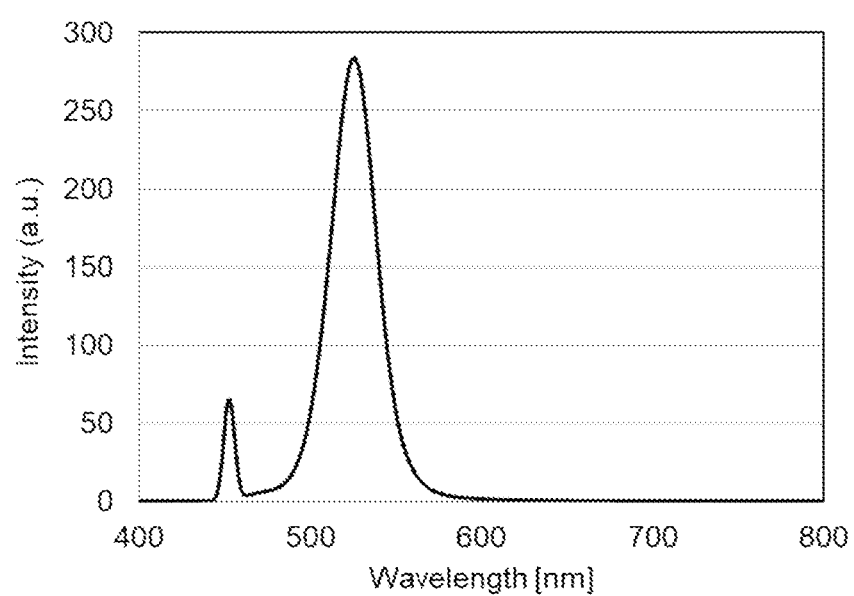
FIG. 14 illustrates the PL spectrum of ZnAgInGaS of Example 14.

1 mL of toluene and 1.6 mL of ethanol were added to 1 mL of the obtained reaction solution, which was then subjected to centrifugation at 5500 rpm for 3 minutes. After that, 2 mL of ethanol was added to the supernatant liquid, which was then subjected to centrifugation at 5500 rpm for 3 minutes, and QDs were re-dispersed in the solution with toluene. The resulting QD-dispersed solution was measured with a fluorescence spectrophotometer. Consequently, as illustrated in FIG. 14, optical properties including a fluorescence wavelength of 528 nm, a fluorescence FWHM of 31 nm, and a quantum yield of 84% were obtained.

Example 15

0.5 mL of a 0.2 M solution obtained by dissolving silver acetate: Ag(OAc) in oleylamine: OLAm, 55.5 mg of gallium acetylacetonate: $Ga(acac)_3$, 20 mL of oleylamine: OLAm, and 3 mL of dodecanethiol: DDT were put into a 100 mL reaction container. These materials were heated while being stirred in an inert gas ($N_2$) atmosphere and thus were dissolved.

The solution was dissolved at 150° C. for 5 minutes, and 0.36 mL of a 0.7 M solution obtained by dissolving selenium: Se in oleylamine: OLAm and dodecanethiol: DDT was added thereto. Then, the solution was stirred for 10 minutes. The obtained reaction solution was cooled down to room temperature, and was then heated while being stirred at 320° C. for 20 minutes. After that, the reaction solution was cooled down to room temperature.

The obtained reaction solution was subjected to centrifugation at 5500 rpm for 3 minutes using a centrifugal separator so as to allow the quantum dots to be precipitated. The precipitated quantum dots were re-dispersed in the solution with toluene, and methanol and ethanol were added thereto. Then, the solution was subjected to centrifugation at 5500 rpm for 3 minutes using a centrifugal separator so as to allow the QDs to be precipitated again. After that, 9.5 mL of OLAm was added to the precipitated QDs for re-dispersing them.

Then, 3.64 mL of a solution, which had been obtained by mixing 3 mL of a 0.1 M solution obtained by dissolving gallium chloride: $GaCl_3$ and oleic acid: OLAc in oleylamine: OLAm so as to attain a molar ratio of Ga:OLAc=1:1.5 and 0.64 mL of a 0.7 M solution obtained by dissolving selenium: Se in oleylamine: OLAm and dodecanethiol: DDT, was dropped for 20 minutes onto the solution that was heated while being stirred at 290° C. After the completion of dropping of the solution, the solution was heated while being stirred for 100 minutes, and then, the obtained reaction solution was cooled down to room temperature. The thus obtained solution was measured with a fluorescence spectrophotometer and was found to exhibit optical properties including a fluorescence wavelength of 639 nm and a fluorescence FWHM of 28.5 nm.

After that, 8 mL of TOP was added to the solution, which was then heated at 200° C. for 5 minutes. Then, 2 mL of a solution, which had been obtained by mixing 1 mL of a 0.8 M solution obtained by dissolving zinc acetate: $Zn(OAc)_2$ in oleic acid: OLAc and trioctylphosphine: TOP and 1 mL of a 0.8 M solution obtained by dissolving sulfur: S in oleylamine: OLAm and dodecanethiol: DDT, was dropped for 20 minutes onto the solution that was heated while being stirred at 200° C. After the completion of dropping of the solution, the solution was heated while being stirred for 130 minutes, and then, the obtained reaction solution was cooled down to room temperature.

Figure 15:
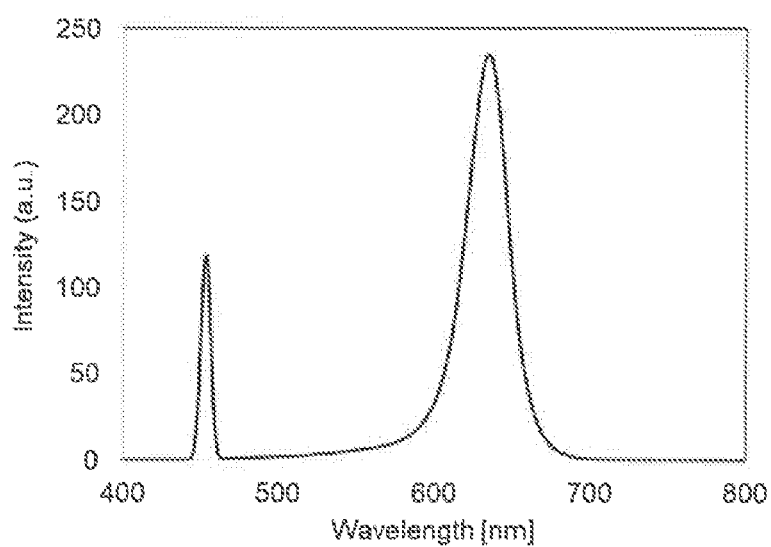
FIG. 15 illustrates the PL spectrum of ZnAgGaSeS of Example 15.

2 mL of trioctylphosphine: TOP was added to 2 mL of the obtained reaction solution. After that, the solution was subjected to centrifugation and the resulting precipitate was removed. The obtained solution was measured with a fluorescence spectrophotometer. Consequently, as illustrated in FIG. 15, optical properties including a fluorescence wavelength of 642 nm, a fluorescence FWHM of 33 nm, and a quantum yield of 76% were obtained.

Example 16

0.5 mL of a 0.2 M solution obtained by dissolving silver acetate: Ag(OAc) in oleylamine: OLAm, 55.5 mg of gallium acetylacetonate: $Ga(acac)_3$, 20 mL of oleylamine: OLAm, and 3 mL of dodecanethiol: DDT were put into a 100 mL reaction container. These materials were heated while being stirred in an inert gas $(N_2)$ atmosphere and thus were dissolved.

The solution was dissolved at 150° C. for 5 minutes, and 0.36 mL of a 0.7 M solution obtained by dissolving selenium: Se in oleylamine: OLAm and dodecanethiol: DDT was added thereto. Then, the solution was stirred for 10 minutes. The obtained reaction solution was cooled down to room temperature, and was then heated while being stirred at 320° C. for 20 minutes. After that, the reaction solution was cooled down to room temperature.

The obtained reaction solution was subjected to centrifugation at 5500 rpm for 3 minutes using a centrifugal separator so as to allow the quantum dots to be precipitated. The precipitated quantum dots were re-dispersed in the solution with toluene, and methanol and ethanol were added thereto. Then, the solution was subjected to centrifugation at 5500 rpm for 3 minutes using a centrifugal separator so as to allow the QDs to be precipitated again. After that, 9.5 mL of OLAm was added to the precipitated QDs for re-dispersing them.

After that, 3.64 mL of a solution, which had been obtained by mixing 3 mL of a 0.1 M solution obtained by dissolving gallium chloride: $GaCl_3$ and oleic acid: OLAc in oleylamine: OLAm so as to attain a molar ratio of Ga:OLAc=1:1.5 and 0.64 mL of a 0.7 M solution obtained by dissolving selenium: Se in oleylamine: OLAm and dodecanethiol: DDT, was dropped for 30 minutes onto the solution that was heated while being stirred at 290° C. After the completion of dropping of the solution, the solution was heated while being stirred for 90 minutes, and then, the obtained reaction solution was cooled down to room temperature.

After that, 8 mL of TOP was added to the solution, which was then heated at 150° C. for 5 minutes. Then, 0.34 mL of a 0.7 M solution obtained by dissolving selenium: Se in oleylamine: OLAm and dodecanethiol: DDT was added to the solution, which was then heated at 150° C. for 40 minutes. 0.17 mL of a 0.7 M solution obtained by dissolving selenium: Se in oleylamine: OLAm and dodecanethiol: DDT, and 0.15 mL of a 0.8 M solution obtained by dissolving sulfur: S in oleylamine: OLAm and dodecanethiol: DDT were added to the solution, which was then heated at 150° C. for 40 minutes. After that, the solution was cooled down to room temperature.

0.4 mL of trioctylphosphine: TOP was added to 2 mL of the obtained reaction solution. After that, the solution was subjected to centrifugation, and the resulting precipitate was removed. The obtained solution was measured with a fluorescence spectrophotometer. Consequently, optical properties including a fluorescence wavelength of 639 nm, a fluorescence FWHM of 30.5 nm, and a quantum yield of 56% were obtained.

Example 17

0.5 mL of a 0.2 M solution obtained by dissolving silver acetate: Ag(OAc) in oleylamine: OLAm, 55.5 mg of gallium acetylacetonate: $Ga(acac)_3$, 20 mL of oleylamine: OLAm, and 3 mL of dodecanethiol: DDT were put into a 100 mL reaction container. These materials were heated while being stirred in an inert gas $(N_2)$ atmosphere and thus were dissolved.

The solution was dissolved at 150° C. for 5 minutes, and 0.36 mL of a 0.7 M solution obtained by dissolving selenium: Se in oleylamine: OLAm and dodecanethiol: DDT was added thereto. Then, the solution was stirred for 10 minutes. The obtained reaction solution was cooled down to room temperature, and was then heated while being stirred at 320° C. for 20 minutes. After that, the reaction solution was cooled down to room temperature.

The obtained reaction solution was subjected to centrifugation at 5500 rpm for 3 minutes using a centrifugal separator so as to allow the quantum dots to be precipitated. The precipitated quantum dots were re-dispersed in the solution with toluene, and methanol and ethanol were added thereto. Then, the solution was subjected to centrifugation at 5500 rpm for 3 minutes using a centrifugal separator so as to allow the QDs to be precipitated again. After that, 9.5 mL of OLAm was added to the precipitated QDs for re-dispersing them.

Then, 3.64 mL of a solution, which had been obtained by mixing 3 mL of a 0.1 M solution obtained by dissolving gallium chloride: $GaCl_3$ and oleic acid: OLAc in oleylamine: OLAm so as to attain a molar ratio of Ga:OLAc=1:1.5 and 0.64 mL of a 0.7 M solution obtained by dissolving selenium: Se in oleylamine: OLAm and dodecanethiol: DDT, was dropped for 30 minutes onto the solution that was heated while being stirred at 290° C. After the completion of dropping of the solution, the solution was heated while being stirred for 90 minutes, and then, the obtained reaction solution was cooled down to room temperature.

After that, 8 mL of TOP was added to the solution, which was then heated at 150° C. for 5 minutes. Then, 0.34 mL of a 0.7 M solution obtained by dissolving selenium: Se in oleylamine: OLAm and dodecanethiol: DDT was added to the solution, which was then heated at 150° C. for 20 minutes. Then, 0.3 mL of a 0.8 M solution obtained by dissolving zinc acetate: $Zn(OAc)_2$ in oleic acid: OLAc and trioctylphosphine: TOP was added to the solution, which was then heated at 150° C. for 20 minutes. Then, 0.17 mL of a 0.7 M solution obtained by dissolving selenium: Se in oleylamine: OLAm and dodecanethiol: DDT, and 0.15 mL of a 0.8 M solution obtained by dissolving sulfur: S in oleylamine: OLAm and dodecanethiol: DDT were added to the solution, which was then heated at 150° C. for 20 minutes. Then, 0.3 mL of a 0.8 M solution obtained by dissolving zinc acetate: $Zn(OAc)_2$ in oleic acid: OLAc and trioctylphosphine: TOP was added to the solution, which was then heated at 150° C. for 20 minutes. After that, the solution was cooled down to room temperature.

Figure 16:
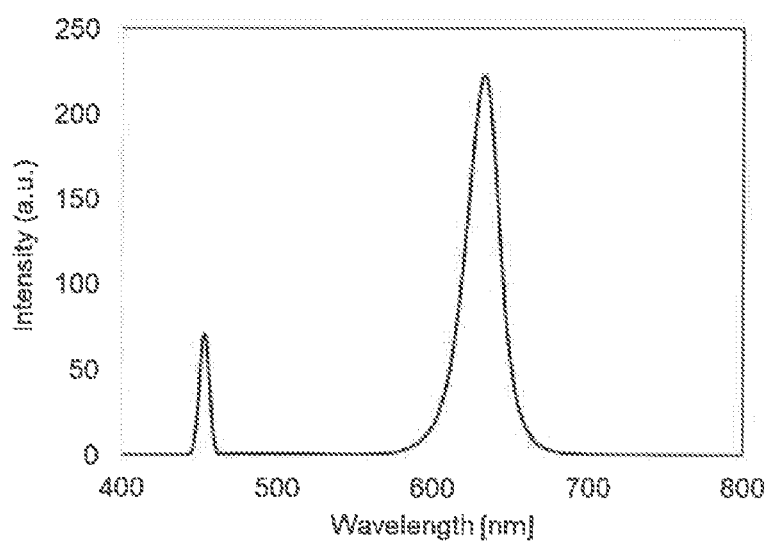
FIG. 16 illustrates the PL spectrum of ZnAgGaSeS of Example 17.

0.4 mL of trioctylphosphine: TOP was added to 2 mL of the obtained reaction solution. After that, the solution was subjected to centrifugation, and the resulting precipitate was removed. The obtained solution was measured with a fluorescence spectrophotometer. Consequently, as illustrated in FIG. 16, optical properties including a fluorescence wavelength of 633 nm, a fluorescence FWHM of 27 nm, and a quantum yield of 81% were obtained.

Example 18

0.5 mL of a 0.2 M solution obtained by dissolving silver acetate: AgOAc in oleylamine: OLAm, 55.5 mg of gallium acetylacetonate: $Ga(acac)_3$, 20 mL of oleylamine: OLAm, and 3 mL of dodecanethiol: DDT were put into a 100 mL reaction container. These materials were heated while being stirred in an inert gas ($N_2$) atmosphere and thus were dissolved.

The solution was dissolved at 150° C. for 5 minutes, and 0.36 mL of a 0.7 M solution obtained by dissolving selenium: Se in oleylamine: OLAm and dodecanethiol: DDT was added thereto. Then, the solution was stirred for 10 minutes. The obtained reaction solution was cooled down to room temperature, and was then heated while being stirred at 320° C. for 20 minutes. After that, the reaction solution was cooled down to room temperature.

The obtained reaction solution was subjected to centrifugation using a centrifugal separator so as to allow the quantum dots to be precipitated. The precipitated quantum dots were re-dispersed in the solution with toluene, and were washed with methanol and ethanol. Then, 9.5 mL of OLAm was added for re-dispersing the quantum dots in the solution.

After that, 3.64 mL of a solution, which had been obtained by mixing 3 mL of a 0.1 M solution obtained by dissolving gallium chloride: $GaCl_3$ and oleic acid: OLAc in oleylamine: OLAm so as to attain a molar ratio of Ga:OLAc=1:1.5 and 0.64 mL of a 0.7 M solution obtained by dissolving selenium: Se in oleylamine: OLAm and dodecanethiol: DDT, was dropped for 20 minutes onto the solution that was heated while being stirred at 290° C. After the completion of dropping of the solution, the solution was heated while being stirred for 100 minutes, and then, the obtained reaction solution was cooled down to room temperature.

After that, 8 mL of TOP was added to the solution, which was then heated at 150° C. for 5 minutes. Then, 0.34 mL of a 0.7 M solution obtained by dissolving selenium: Se in oleylamine: OLAm and dodecanethiol: DDT was added to the solution, which was then heated at 150° C. for 20 minutes. Then, 0.6 mL of a 0.4 M solution obtained by dissolving zinc acetate: $Zn(OAc)_2$ in oleic acid: OLAc and oleylamine: OLAm was added to the solution, which was then heated at 150° C. for 20 minutes. Then, 0.17 mL of a 0.7 M solution obtained by dissolving selenium: Se in oleylamine: OLAm and dodecanethiol: DDT, and 0.15 mL of a 0.8 M solution obtained by dissolving sulfur: S in oleylamine: OLAm and dodecanethiol: DDT were added to the solution, which was then heated at 150° C. for 20 minutes. Then, 0.6 mL of a 0.4 M solution obtained by dissolving zinc acetate: $Zn(OAc)_2$ in oleic acid: OLAc and oleylamine: OLAm was added to the solution, which was then heated at 150° C. for 20 minutes. After that, the solution was cooled down to room temperature.

Figure 17:
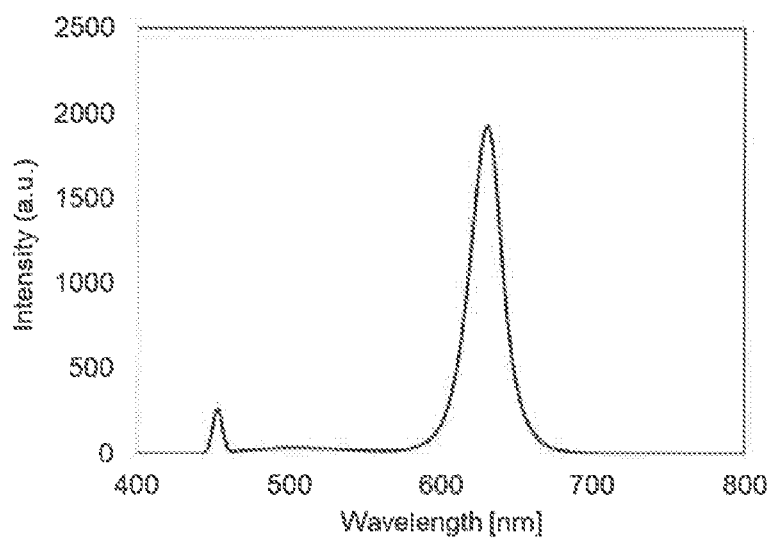
FIG. 17 illustrates the PL spectrum of ZnAgGaSeS of Example 18.

0.4 mL of trioctylphosphine: TOP was added to 2 mL of the obtained reaction solution. After that, the solution was subjected to centrifugation, and the resulting precipitate was removed. The obtained solution was measured with a fluorescence spectrophotometer. Consequently, as illustrated in FIG. 17, optical properties including a fluorescence wavelength of 630.5 nm, a fluorescence FWHM of 24.5 nm, and a quantum yield of 70% were obtained.

Example 19

0.5 mL of a 0.2 M solution obtained by dissolving silver acetate: Ag(OAc) in oleylamine: OLAm, 53.3 mg of gallium acetylacetonate: $Ga(acac)_3$, 0.25 mL of a 0.02 M solution obtained by dissolving indium acetylacetonate: $In(acac)_3$ in oleylamine: OLAm and oleic acid: OLAc, 9.5 mL of oleylamine: OLAm, and 2.5 mL of dodecanethiol: DDT were put into a 100 mL reaction container. These materials were heated while being stirred in an inert gas ($N_2$) atmosphere and thus were dissolved.

The solution was dissolved at 150° C. for 5 minutes, and 0.36 mL of a 0.7 M solution obtained by dissolving selenium: Se in oleylamine: OLAm and dodecanethiol: DDT was added thereto. Then, the solution was stirred for 10 minutes. The obtained reaction solution was cooled down to room temperature, and was then heated while being stirred at 320° C. for 60 minutes. After that, the reaction solution was cooled down to room temperature.

The obtained reaction solution was subjected to centrifugation using a centrifugal separator so as to allow the quantum dots to be precipitated. The precipitated quantum dots were re-dispersed in the solution with toluene, and then were washed with methanol and ethanol. Then, 9.5 ml of OLAm was added for re-dispersing the quantum dots in the solution.

After that, 3.57 mL of a solution, which had been obtained by mixing 3 mL of a 0.1 M solution obtained by dissolving gallium chloride: $GaCl_3$ and oleic acid: OLAc in oleylamine: OLAm so as to attain a molar ratio of Ga:OLAc=1:1.5 and 0.57 mL of a 0.8 M solution obtained by dissolving sulfur: S in oleylamine: OLAm and dodecanethiol: DDT, was dropped for 30 minutes onto the solution that was heated while being stirred at 260° C. After the completion of dropping of the solution, the solution was heated while being stirred for 150 minutes, and then, the obtained reaction solution was cooled down to room temperature.

After that, 0.15 mL of a 0.8 M solution obtained by dissolving zinc acetate: $Zn(OAc)_2$ in oleic acid: OLAc and trioctylphosphine: TOP, and 0.15 mL of a 0.8 M solution obtained by dissolving sulfur: S in oleylamine: OLAm and dodecanethiol: DDT were added to the solution, which was then heated at 150° C. for 20 minutes. After that, 3 mL of trioctylphosphine: TOP was added to the solution, which was then heated at 150° C. for 10 minutes. Then, 0.15 mL of a 0.8 M solution obtained by dissolving zinc acetate: $Zn(OAc)_2$ in oleic acid: OLAc and trioctylphosphine: TOP, and 0.15 mL of a 0.8 M solution obtained by dissolving sulfur: S in oleylamine: OLAm and dodecanethiol: DDT were added to the solution, which was then heated at 150° C. for 20 minutes.

Figure 18:
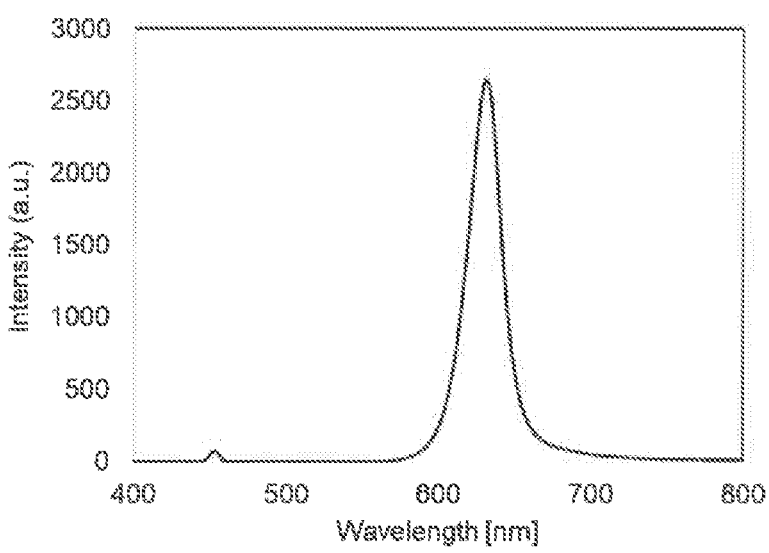
FIG. 18 illustrates the PL spectrum of ZnAgInGaSeS of Example 19.

0.4 mL of trioctylphosphine: TOP was added to 2 mL of the obtained reaction solution. After that, the solution was subjected to centrifugation, and the resulting precipitate was removed. The obtained solution was measured with a fluorescence spectrophotometer. Consequently, as illustrated in FIG. 18, optical properties including a fluorescence wavelength of 631 nm, a fluorescence FWHM of 25 nm, and a quantum yield of 67% were obtained.

Example 20

0.5 mL of a 0.2 M solution obtained by dissolving silver acetate: Ag(OAc) in oleylamine: OLAm, 55.5 mg of gallium acetylacetonate: Ga(acac)$_3$, 20 mL of oleylamine: OLAm, and 3 mL of dodecanethiol: DDT were put into a 100 mL reaction container. These materials were heated while being stirred in an inert gas (N$_2$) atmosphere and thus were dissolved.

The solution was dissolved at 150° C. for 5 minutes, and 0.36 mL of a 0.7 M solution obtained by dissolving selenium: Se in oleylamine: OLAm and dodecanethiol: DDT was added thereto. Then, the solution was stirred for 10 minutes. The obtained reaction solution was cooled down to room temperature, and was then heated while being stirred at 320° C. for 20 minutes. After that, the reaction solution was cooled down to room temperature.

The obtained reaction solution was subjected to centrifugation using a centrifugal separator so as to allow the quantum dots to be precipitated. The precipitated quantum dots were re-dispersed in the solution with toluene, and then were washed with methanol and ethanol. Then, 9.5 mL of OLAm was added for re-dispersing the quantum dots in the solution.

After that, 3.5 mL of a solution, which had been obtained by mixing 3 mL of a 0.1 M solution obtained by dissolving gallium chloride: GaCl$_3$ and oleic acid: OLAc in oleylamine: OLAm so as to attain a molar ratio of Ga:OLAc=1:1.5 and 0.5 mL of a 0.8 M solution obtained by dissolving sulfur: S in oleylamine: OLAm and dodecanethiol: DDT, was dropped for 10 minutes onto the solution that was heated while being stirred at 290° C. After the completion of dropping of the solution, the solution was heated while being stirred for 110 minutes, and then, the obtained reaction solution was cooled down to room temperature.

After that, 8 mL of TOP was added to the solution, which was then heated at 150° C. for 5 minutes. Then, 0.34 mL of a 0.7 M solution obtained by dissolving selenium: Se in oleylamine: OLAm and dodecanethiol: DDT was added to the solution, which was then heated at 150° C. for 20 minutes. Then, 0.3 mL of a 0.8 M solution obtained by dissolving zinc acetate: Zn(OAc)$_2$ in oleic acid: OLAc and trioctylphosphine: TOP was added to the solution, which was then heated at 150° C. for 20 minutes. Then, 0.17 mL of a 0.7 M solution obtained by dissolving selenium: Se in oleylamine: OLAm and dodecanethiol: DDT, and 0.15 mL of a 0.8 M solution obtained by dissolving sulfur: S in oleylamine: OLAm and dodecanethiol: DDT were added to the solution, which was then heated at 150° C. for 20 minutes. Then, 0.3 mL of a 0.8 M solution obtained by dissolving zinc acetate: Zn(OAc)$_2$ in oleic acid: OLAc and trioctylphosphine: TOP was added to the solution, which was then heated at 150° C. for 20 minutes. After that, the obtained reaction solution was cooled down to room temperature.

Figure 19:
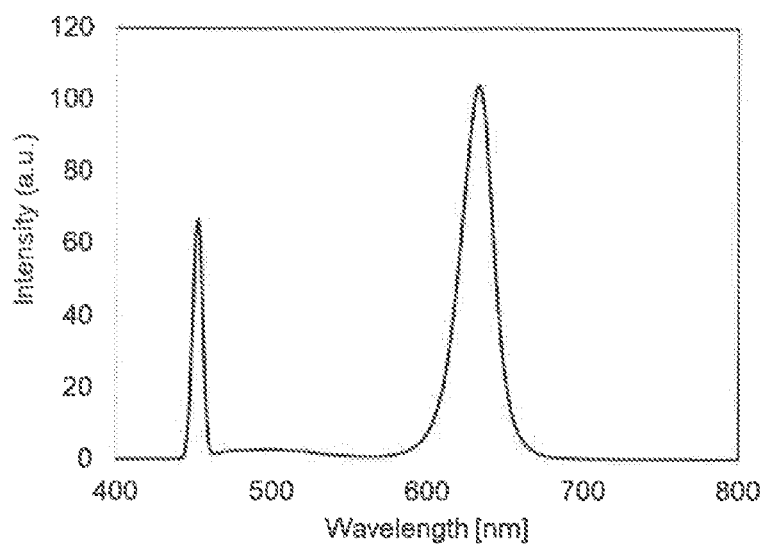
FIG. 19 illustrates the PL spectrum of ZnAgGaSeS of Example 20.

0.4 mL of trioctylphosphine: TOP was added to 2 mL of the obtained reaction solution. After that, the solution was subjected to centrifugation, and the resulting precipitate was removed. The obtained solution was measured with a fluorescence spectrophotometer. Consequently, as illustrated in FIG. 19, optical properties including a fluorescence wavelength of 633 nm, a fluorescence FWHM of 23.9 nm, and a quantum yield of 75% were obtained.

Comparative Example 1

0.5 mL of a 0.2 M solution obtained by dissolving silver acetate: Ag(OAc) in oleylamine: OLAm, 29 mg of indium acetate: In(OAc)$_3$, 9.5 mL of oleylamine: OLAm, and 0.5 mL of dodecanethiol: DDT were put into a 100 mL reaction container. These materials were heated while being stirred in an inert gas (N$_2$) atmosphere and thus were dissolved.

The solution was dissolved at 120° C. for 5 minutes, and 1 mL of a 0.2 M solution obtained by dissolving sulfur: S in octadecene: ODE (S-ODE) was added thereto. After that, while the temperature of the solution was increased from 120 to 200° C., the solution was heated while being stirred for a total of 20 minutes. The obtained reaction solution was cooled down to room temperature.

27.9 mg of indium diethyldithiocarbamate: In[SC(=S)N(C$_2$H$_5$)$_2$]$_3$ was added as a carbamate to the obtained reaction solution, which was then heated again while being stirred at 260° C. for 10 minutes.

After that, 3.5 mL of a solution, which had been obtained by mixing 2 mL of a 0.1 M solution obtained by dissolving gallium chloride: GaCl$_3$ and myristic acid: MA in octadecene: ODE so as to attain a molar ratio of Ga:MA=1:3 and 1.5 mL of a 0.2 M solution obtained by dissolving sulfur: S in octadecene: ODE, was dropped for 50 minutes onto the solution that was heated while being stirred at 260° C. After the completion of dropping of the solution, the solution was heated while being stirred for 70 minutes, and then, the obtained reaction solution was cooled down to room temperature.

Figure 20:
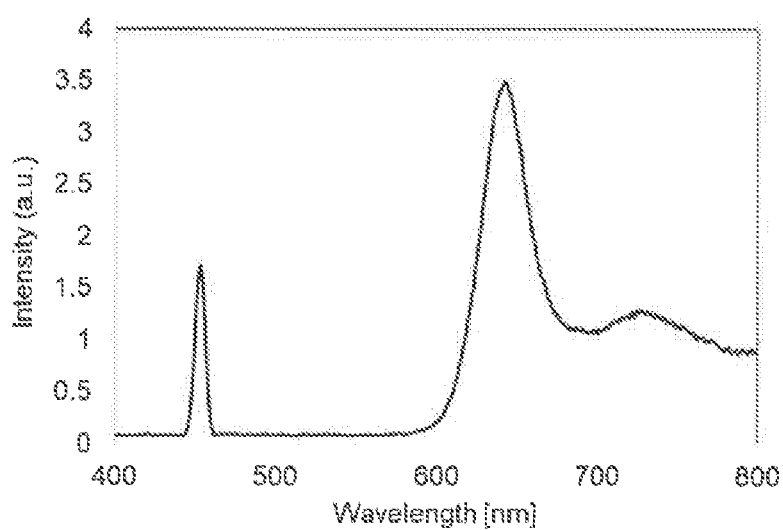
FIG. 20 illustrates the PL spectrum of ZnAgInGaS of Comparative Example 1.

The obtained reaction solution was measured with a fluorescence spectrophotometer. Consequently, as illustrated in FIG. 20, optical properties including a fluorescence wavelength of about 641 nm and a fluorescence FWHM of about 33.8 nm were obtained. It should be noted that the fluorescence quantum yield was too low to measure.

Table 1 below collectively illustrates the initial particle composition, elements added later, fluorescence wavelength, fluorescence FWHM, and fluorescence quantum yield (PLQY) of each Example. Table 2 collectively illustrates mainly the differences from Example 1 (i.e., green QDs) and Example 15 (i.e., red QDs) as references.

TABLE 1

| | Initial Particle Composition | Elements Added Later | Wavelength (nm) | FWHM (nm) | PLQY (%) |
|---|---|---|---|---|---|
| Example 1 | AgGaS | InGaS | 539 | 35.4 | 75 |
| Example 2 | AgGaS | InGaS | 526.5 | 34.8 | 54 |
| Example 3 | AgGaS | InGaS | 527.5 | 36.9 | 56 |
| Example 4 | AgGaS | InGaS | 532 | 36.9 | 65 |
| Example 5 | AgGaS | InGaS | 542 | 36.5 | 71 |
| Example 6 | AgGaS | InGaS | 548.5 | 30.5 | 59 |
| Example 7 | AgGaS | InGaS | 546.5 | 36.2 | 81 |
| Example 8 | AgGaS | InGaS | 522 | 38 | 46 |
| Example 9 | AgGaS | InGaS | 534 | 40 | 45 |
| Example 10 | AgGaS | InGaS | 536.5 | 29.4 | 71 |
| Example 11 | AgGaS | InGaS | 530.5 | 38 | 86 |
| Example 12 | AgGaS | InGaS | 537.5 | 25 | 63 |
| Example 13 | AgGaS | InGaS | 531 | 29.3 | 85 |
| Example 14 | AgGaS | ZnInGaS | 528 | 31 | 84 |
| Example 15 | AgGaSe | ZnGaSeS | 642 | 33 | 76 |
| Example 16 | AgGaSe | GaSeS | 639 | 30.5 | 56 |
| Example 17 | AgGaSe | ZnGaSeS | 633 | 27 | 81 |
| Example 18 | AgGaSe | ZnGaSeS | 630.5 | 24.5 | 70 |

TABLE 1-continued

| | Initial Particle Composition | Elements Added Later | Wavelength (nm) | FWHM (nm) | PLQY (%) |
|---|---|---|---|---|---|
| Example 19 | AgGaInSe | ZnGaS | 631 | 25 | 67 |
| Example 20 | AgGaSe | ZnGaSeS | 633 | 23.9 | 75 |
| Comparative Example 1 | AgInS | InGaS | 641 | 33.8 | — |

TABLE 2

| | Differences |
|---|---|
| Example 1 | Green QDs as a reference |
| Example 2 | Type of S used: DPTT |
| Example 3 | Type of S used: DTDM |
| Example 4 | Type of S used: Isopropyl xanthogen disulfide |
| Example 5 | Type of S used: TMTDS |
| Example 6 | Type of S used: TETDS |
| Example 7 | Type of S used: TETDS |
| Example 8 | Type of S used: S-ODE |
| Example 9 | Type of S used: S-ODE |
| Example 10 | Type of S used: TETDS |
| Example 11 | Type of S used: TETDS Washing was performed after synthesis of initial particles. |
| Example 12 | Type of S used: TETDS Centrifugation and washing separation were performed. |
| Example 13 | Type of S used: TETDS The amounts of In, Ga, and S for coverage were increased than those of Example 12. |
| Example 14 | Type of S used: TETDS The elements added later include Zn. |
| Example 15 | Red QDs as a reference |
| Example 16 | The elements added later do not include Zn, and were added at a low temperature. |
| Example 17 | Zn was added to the elements added later of Example 16. |
| Example 18 | The Zn material used in Example 17 was changed to Zn-OLAc/OLAm. |
| Example 19 | In was added to the initial particle composition of Example 17. |
| Example 20 | The elements added later: Ga and Se of Example 17 were changed to Ga and S. |
| Comparative Example 1 | Type of S used: S-ODE In was added instead of Ga for the initial particle composition. |

As illustrated in Table 1, the initial particle composition of each of Examples 1 to 18 and 20 does not include In, and excellent properties were obtained in each Example. In contrast, the initial particle composition of Comparative Example 1 includes In, and the fluorescence quantum yield, in particular, was too low to observe.

The "elements added later" include the composition of a shell covering a core surface. However, as a result of the TEM-EDX analysis, it was found that no clear core-shell structure was able to be confirmed and all of the materials added included mixed crystals. However, as described above, when particles synthesized by a reaction in the initial stage do not include In, excellent properties were obtained. For this reason, the "initial particle composition" and "elements added later" are separately listed.

I addition, Example 16 does not include Zn, while Example 17 includes Zn, and Example 17 exhibited more excellent properties than Example 16.

As illustrated in Table 1, it is found that all of Examples exhibited a fluorescence FWHM of less than or equal to 45 nm, or preferably, less than or equal to 30 nm. It is also found that all of Examples exhibited a fluorescence quantum yield of greater than or equal to 35%, or preferably, greater than or equal to 70%.

In addition, as illustrated in Table 1, it is found that the fluorescence wavelength can be adjusted in the range of 400 to 700 nm, and that green-light emitting quantum dots can be synthesized according to Examples 1 to 14, while red-light emitting quantum dots can be synthesized according to Examples 15 to 20.

In contrast, the AIS-based quantum dots described in Patent Literatures have a fluorescence FWHM of greater than or equal to 45 nm or a fluorescence quantum yield of less than or equal to 35% in the green wavelength range to the red wavelength range. Thus, it has been impossible to obtain quantum dots containing $AgIn_xGa_{1-x}S_ySe_{1-y}$ or $ZnAgIn_xGa_{1-x}S_ySe_{1-y}$ (where $0 \leq x < 1$ and $0 \leq y \leq 1$) with a narrow fluorescence FWHM and a high fluorescence quantum yield unlike with Examples of the present invention.

Figure 21:
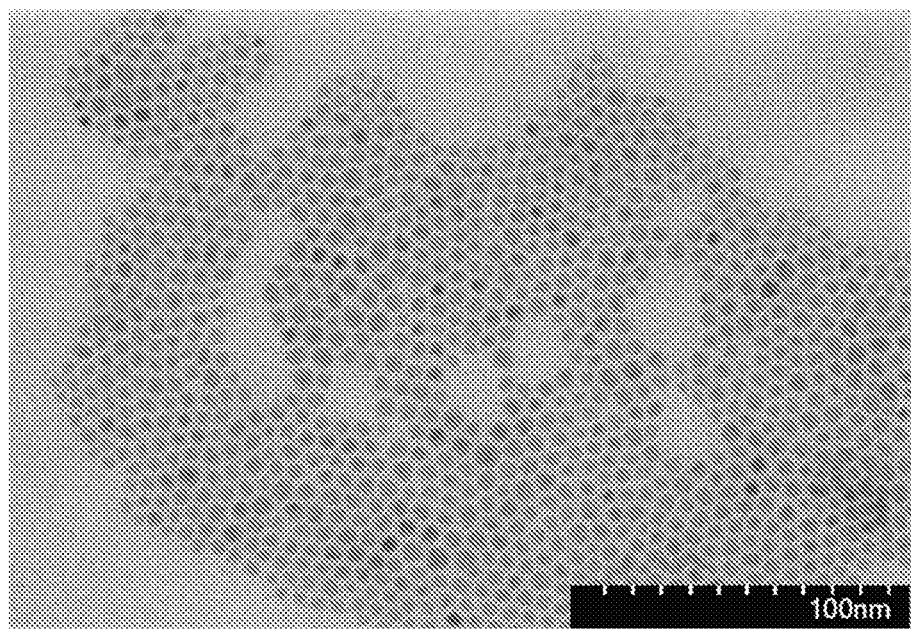
FIG. 21 is a scanning electron microscopy (SEM) photograph of AgInGaS of Example 7.

A solution having dispersed therein the AgInGaS particles of Example 7 was measured using scanning electron microscopy (SEM). FIG. 21 illustrates the measurement result obtained with scanning electron microscopy (SEM).

As illustrated in FIG. 21, it was found that mass production of a large number of quantum dots with an approximately uniform particle size is possible.

Figure 22:
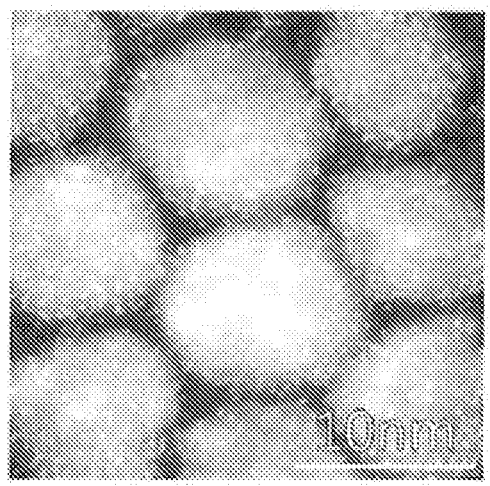
FIG. 22 is a photograph of the TEM-EDX analysis results of Example 15.
Figure 23:
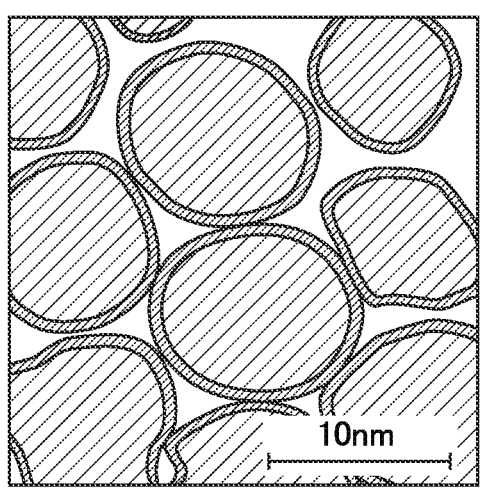
FIG. 23 is a partial schematic view of FIG. 22.

FIG. 22 illustrates the result (i.e., an observed image) of analyzing the quantum dots of Example 15 using TEM-EDX. FIG. 23 is a partial schematic view of the observed image illustrated in FIG. 22. As illustrated in FIGS. 22 and 23, it was found that the more Zn is detected, the darker the color appears and thus that Zn is present mainly on the surfaces of the quantum dots.

INDUSTRIAL APPLICABILITY

According to the present invention, quantum dots that emit high-brightness green fluorescence or red fluorescence, for example, can be stably obtained. Further, applying the quantum dots of the present invention to an LED, a backlight apparatus, or a display apparatus, for example, can obtain excellent light emission properties in each apparatus.

The present application is based on Japanese Patent Application No. 2019-153204 filed on Aug. 23, 2019, which is incorporated herein by reference in its entirety.

The invention claimed is:

1. A quantum dot comprising $ZnAgIn_xGa_{1-x}S_ySe_{1-y}$ ($0 \leq x < 1$ and $0 \leq y \leq 1$),
    wherein the quantum dot exhibits fluorescence properties including a fluorescence full width at half maximum of less than or equal to 45 nm and a fluorescence quantum yield of greater than or equal to 35% in a green wavelength range to a red wavelength range, and
    wherein a ratio of Ag to Ga is in a range of Ag/Ga=0.05 to 10, and a ratio of Zn to Ga is in a range of Zn/Ga=0.1 to 10.

2. The quantum dot according to claim 1, wherein the quantum dot comprises
    at least Zn Ag, Ga, and S or
    at least Zn Ag, Ga, and Se,
    and does not comprise Cd.

3. The quantum dot according to claim 2, wherein the quantum dot has a core-shell structure of a core and a shell that covers a surface of the core,
    wherein the core includes a nanocrystal of
    at least Ag, Ga, and S, or
    at least Ag, Ga, and Se, and
    wherein the shell includes at least Zn.

4. The quantum dot according to claim 1, wherein the fluorescence full width at half maximum is less than or equal to 35 nm.

5. The quantum dot according to claim 1, wherein the quantum dot exhibits the fluorescence properties including the fluorescence quantum yield that is greater than or equal to 70%.

6. The quantum dot according to claim 1, wherein a fluorescence wavelength of the quantum dot is in a range of 400 to 700 nm.

7. The quantum dot according to claim 1, wherein the fluorescence full width at half maximum is less than or equal to 30 nm, the fluorescence quantum yield is greater than or equal to 80%, and a fluorescence wavelength is in a range of 510 to 650 nm.

8. A method for producing synthesizing quantum dots, comprising:
synthesizing
a composition including
an organic silver compound,
an organic gallium compound, and
sulfur or selenium, or
a composition including
an organic silver compound,
an organic indium compound,
an organic gallium compound,
and sulfur or selenium, and
thereafter, adding an organic zinc compound or an inorganic zinc compound, each quantum dot containing $ZnAgIn_xGa_{1-x}S_ySe_{1-y}$ (wherein $0 \leq x < 1$ and $0 \leq y \leq 1$) and exhibiting fluorescence properties including a fluorescence full width at half maximum of less than or equal to 45 nm and a fluorescence quantum yield of greater than or equal to 35% in a green wavelength range to a red wavelength range.

9. The method for synthesizing the quantum dots according to claim 8, wherein each quantum dot contains
at least Zn Ag, Ga, and S or
at least Zn Ag, Ga, and Se,
and does not contain Cd.

10. The method for synthesizing the quantum dots according to claim 9, wherein:
the synthesizing the quantum dots includes forming particles in an initial stage of a reaction and adding a predetermined element later, and
the particles do not contain In in the initial stage of the reaction.

11. The method for synthesizing the quantum dots according to claim 10, wherein Zn is not added in the initial stage of the reaction and is added later.

12. The method for synthesizing the quantum dots according to claim 8, wherein thiuram, disulfide, S-ODE obtained by dissolving S in octadecene, or S-OLAm/DDT obtained by dissolving S in oleylamine and dodecanethiol is used as a S source.

13. The method for synthesizing the quantum dots according to claim 8, wherein Se-OLAm/DDT obtained by dissolving Se in oleylamine and dodecanethiol is used as a Se source.

14. The method for synthesizing the quantum dots according to claim 8, wherein gallium acetylacetonate ($Ga(acac)_3$) or gallium chloride ($GaCl_3$) is used as a Ga source.

15. The method for synthesizing the quantum dots according to claim 9, further comprising adding TOP to a reaction solution obtained by mixing an Ag source, a Ga source and a S source, or mixing an Ag source, a Ga source, and a Se source, or further comprising performing a dispersion process using TOP for the reaction solution.

16. The method for synthesizing the quantum dots according to claim 9, further comprising centrifuging a reaction solution synthesized by mixing an Ag source, a Ga source, and a S source, or mixing an Ag source, a Ga source, and a Se source.

17. The method for synthesizing the quantum dots according to a claim 16, wherein the centrifugation is performed by adding as a solvent toluene, methanol, ethanol, or acetone to the reaction solution synthesized by mixing the Ag source, the Ga source, and the S source, or mixing the Ag source, the Ga source, and the Se source.

* * * * *